United States Patent
Wang et al.

(10) Patent No.: US 10,616,123 B2
(45) Date of Patent: Apr. 7, 2020

(54) APPARATUS AND METHOD FOR ADAPTIVE DE-JITTER BUFFER

(71) Applicant: QUALCOMM Incorporated, San Diego, CA (US)

(72) Inventors: Min Wang, San Diego, CA (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 15/644,545

(22) Filed: Jul. 7, 2017

(65) Prior Publication Data
US 2019/0014050 A1    Jan. 10, 2019

(51) Int. Cl.
*H04L 12/841* (2013.01)
*H04L 12/26* (2006.01)
(Continued)

(52) U.S. Cl.
CPC ............ *H04L 47/283* (2013.01); *H04L 1/205* (2013.01); *H04L 43/087* (2013.01);
(Continued)

(58) Field of Classification Search
CPC ....... H04L 1/205; H04L 41/147; H04L 43/08; H04L 43/0829; H04L 43/0835;
(Continued)

(56) References Cited

U.S. PATENT DOCUMENTS 6,188,698 B1 *  2/2001  Galand ................... H04L 47/10
                                                           370/229
6,600,759 B1    7/2003  Wood
(Continued)

FOREIGN PATENT DOCUMENTS

EP       1655911 A2 *  5/2006  ............ H04J 3/0632
WO    2006026635 A3    3/2006
(Continued)

OTHER PUBLICATIONS

Schulzrinne et al., RTP: A Transport Protocol for Real-Time Applications, Jan. 1996, IETF, RFC 1889 (Year: 1996).*

*Primary Examiner* — Eric Nowlin
(74) *Attorney, Agent, or Firm* — Moore IP/Qualcomm Incorporated

(57) ABSTRACT

In a particular aspect, an apparatus includes a de-jitter buffer configured to store a plurality of audio packets received from a source device. The apparatus includes de-jitter buffer control circuitry configured to adjust at least one bound of a target delay range associated with the de-jitter buffer based at least in part on an estimated jitter associated with the plurality of audio packets, an estimated underflow rate associated with the plurality of audio packets, or both. The apparatus includes a processor configured to generate an audio signal based on the plurality of audio packets stored at the de-jitter buffer. The apparatus includes a receiver configured to receive the plurality of audio packets via a network from the source device. The apparatus further includes a speaker configured to output the audio signal.

30 Claims, 12 Drawing Sheets

(51) Int. Cl.
*H04L 12/861* (2013.01)
*H04L 1/20* (2006.01)
*H04L 12/825* (2013.01)

(52) U.S. Cl.
CPC .......... *H04L 43/0829* (2013.01); *H04L 43/16* (2013.01); *H04L 49/9005* (2013.01); *H04L 47/25* (2013.01)

(58) Field of Classification Search
CPC ............. H04L 43/0852; H04L 43/0858; H04L 43/0864; H04L 43/087; H04L 43/16; H04L 47/29
See application file for complete search history.

(56) References Cited

U.S. PATENT DOCUMENTS

| | | | | |
|---|---|---|---|---|
| 6,700,893 | B1* | 3/2004 | Radha | H04L 47/10 370/252 |
| 6,788,651 | B1* | 9/2004 | Brent | H04L 47/10 370/255 |
| 7,079,486 | B2* | 7/2006 | Colavito | H04L 12/6418 370/231 |
| 7,817,677 | B2* | 10/2010 | Black | H04L 47/28 370/516 |
| 7,826,441 | B2* | 11/2010 | Black | H04J 3/0632 370/352 |
| 7,830,900 | B2* | 11/2010 | Black | H04L 29/06027 370/412 |
| 7,835,280 | B2* | 11/2010 | Pang | G06F 15/7842 370/230.1 |
| 7,881,284 | B2* | 2/2011 | Lin | G10L 19/167 370/351 |
| 7,920,475 | B2* | 4/2011 | Lee | H04L 47/10 370/235 |
| 8,594,126 | B2* | 11/2013 | Stoica | H04L 47/225 370/412 |
| 8,599,869 | B2* | 12/2013 | Lee | H04L 47/10 370/412 |
| 9,521,057 | B2* | 12/2016 | Klingbeil | H04L 47/2416 |
| 9,634,947 | B2* | 4/2017 | Krinsky | H04L 47/283 |
| 9,653,092 | B2* | 5/2017 | Sun | H04M 9/082 |
| 9,660,887 | B1* | 5/2017 | Klingbeil | H04L 47/2416 |
| 9,882,818 | B2* | 1/2018 | Shao | H04L 43/087 |
| 9,942,119 | B2* | 4/2018 | Kruger | H04J 3/0632 |
| 10,135,707 | B2* | 11/2018 | Sung | H04L 43/0858 |
| 10,454,811 | B2* | 10/2019 | Lee | H04L 43/04 |
| 2003/0086372 | A1* | 5/2003 | Pate | H04J 3/0632 370/235 |
| 2003/0152094 | A1* | 8/2003 | Colavito | H04L 12/6418 370/412 |
| 2004/0062260 | A1* | 4/2004 | Raetz | G10L 19/18 370/412 |
| 2006/0045138 | A1* | 3/2006 | Black | G10L 19/005 370/516 |
| 2006/0045139 | A1* | 3/2006 | Black | H04L 47/29 370/516 |
| 2006/0050743 | A1* | 3/2006 | Black | H04J 3/0632 370/516 |
| 2006/0056383 | A1* | 3/2006 | Black | H04L 47/28 370/350 |
| 2006/0092918 | A1* | 5/2006 | Talalai | H04J 3/0632 370/352 |
| 2007/0211704 | A1* | 9/2007 | Lin | G10L 19/167 370/356 |
| 2010/0149976 | A1* | 6/2010 | Lee | H04L 47/10 370/231 |
| 2011/0158094 | A1* | 6/2011 | Lee | H04L 47/10 370/231 |
| 2011/0167147 | A1* | 7/2011 | Andersson | H04L 43/0858 709/224 |
| 2011/0273985 | A1* | 11/2011 | Siemens | H04L 47/10 370/235 |
| 2014/0226476 | A1* | 8/2014 | Bertze | H04L 47/30 370/230.1 |
| 2015/0029938 | A1* | 1/2015 | Eller | H04L 65/4061 370/328 |
| 2015/0124640 | A1* | 5/2015 | Chu | H04L 45/22 370/253 |
| 2015/0332704 | A1* | 11/2015 | Sun | H04M 9/082 704/227 |
| 2016/0105473 | A1* | 4/2016 | Klingbeil | H04L 47/2416 370/260 |
| 2016/0234088 | A1* | 8/2016 | Kruger | H04J 3/0632 |
| 2016/0261512 | A1* | 9/2016 | Lautenschlaeger | H04L 41/0631 |
| 2016/0308791 | A1* | 10/2016 | Subasingha | H04L 12/56 |
| 2017/0063704 | A1* | 3/2017 | Krinsky | H04L 47/283 |
| 2017/0187635 | A1* | 6/2017 | Subasingha | H04L 47/283 |
| 2018/0295050 | A1* | 10/2018 | Lee | H04L 45/121 |
| 2019/0014050 | A1* | 1/2019 | Wang | H04L 47/283 |

FOREIGN PATENT DOCUMENTS

WO 2008068167 A1 6/2008
WO WO-2009093945 A1 * 7/2009 ............ H04L 47/10

* cited by examiner

APPARATUS AND METHOD FOR ADAPTIVE DE-JITTER BUFFER

I. FIELD

The present disclosure is generally related to processing audio packets.

II. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

In order to enable conversations between users of different mobile devices, a source device may receive an input audio signal (e.g., user speech) and generate audio packets based on the input audio signal. The source device may transmit the audio packets to a receiving device via a network, such as a packet-switched network. In a packet-switched communication system, the delay for packets to travel from source to destination may vary depending upon various operating conditions including, but not limited to, channel conditions, network loading, and various paths through the network. Thus, the audio packets may be received after different delays, which may also result in out of order reception (e.g., a sequentially first audio packet may be received after a sequentially next audio packet) at the receiving device. The variation in the reception delay is referred to as jitter. A de-jitter buffer at the receiving device enables the receiving device to play out the received audio packets in the correct order and with correct time relation by adaptively delaying play out of one or more audio packets to achieve a balance between the underflow rate, which impacts the speech quality, and the mouth-to-ear delay for conversational service. For example, if audio packets are generated every 20 milliseconds (ms) at the source device, the de-jitter buffer may cause play out of an audio packet for each 20 ms interval, regardless of the varying delays associated with receipt of the audio packets. However, an adaptive delay value selected from within a particular range of possible adaptive delay values that improves performance while a mobile device is connected to a first network (e.g., a long term evolution (LTE) network or a Wi-Fi® network (Wi-Fi is a registered trademark of the Wi-Fi Alliance)) may not improve performance when the mobile device moves from the first network to a second network (e.g., from the LTE network to the Wi-Fi network or from the Wi-Fi network to the LTE network) with different jitter characteristics during a phone call.

III. SUMMARY

In a particular aspect, an apparatus includes a de-jitter buffer configured to store a plurality of audio packets received from a source device. The apparatus includes de-jitter buffer control circuitry configured to adjust at least one bound of a target delay range associated with the de-jitter buffer based at least in part on an estimated jitter associated with the plurality of audio packets, an estimated underflow rate associated with the plurality of audio packets, or both. Target delay refers to a delay before play out of a first packet of a group of packets from the de-jitter buffer, and a target delay value may be selected from the target delay range, based on the estimated jitter, the estimated underflow rate, or both. The apparatus includes a processor configured to generate an audio signal based on the plurality of audio packets stored at the de-jitter buffer. The apparatus includes a receiver configured to receive the plurality of audio packets via a network from the source device. The apparatus further includes a speaker configured to output the audio signal.

In another particular aspect, a method includes receiving, at a first device, a plurality of audio packets via a network from a second device. The method includes storing the plurality of audio packets at a de-jitter buffer of the first device. The method also includes adjusting at least one bound of a target delay range associated with the de-jitter buffer based at least in part on an estimated jitter associated with the plurality of audio packets, an estimated underflow rate associated with the plurality of audio packets, or both. The method includes generating, at the first device, an audio signal based on the plurality of audio packets stored at the de-jitter buffer. The method includes outputting the audio signal at the first device.

In another particular aspect, an apparatus includes means for receiving a plurality of audio packets with varying delays from a device. The apparatus includes means for storing the plurality of audio packets. The apparatus includes means for adjusting at least one bound of a target delay range associated with the means for storing based at least in part on an estimated jitter associated with the plurality of audio packets, an estimated underflow rate associated with the plurality of audio packets, or both. The apparatus includes means for generating an audio signal based on the plurality of audio packets. The apparatus further includes means for outputting the audio signal.

In another particular aspect, a non-transitory, computer readable medium includes instructions that, when executed by a processor, cause the processor to perform operations including receiving, at a first device, a plurality of audio packets via a network from a second device. The operations include storing the plurality of audio packets at a de-jitter buffer of the first device. The operations include adjusting at least one bound of a target delay range associated with the de-jitter buffer based at least in part on an estimated jitter associated with the plurality of audio packets, an estimated underflow rate associated with the plurality of audio packets, or both. The operations include generating, at the first device, an audio signal based on the plurality of audio packets stored at the de-jitter buffer. The operations further include outputting the audio signal at the first device.

In another particular aspect, an apparatus includes a de-jitter buffer configured to store a plurality of audio packets received from a source device. The apparatus also includes de-jitter buffer control circuitry configured to drop one or more audio packets from the de-jitter buffer based on a relative play out delay metric satisfying a threshold. The relative play out delay metric is based on a result of a comparison of a difference between audio play out time values and a difference between audio generation time values at the source.

In another particular aspect, a method includes storing a plurality of audio packets received from a second device at a de-jitter buffer of a first device. The method also includes dropping one or more audio packets from the de-jitter buffer based on a relative play out delay metric satisfying a threshold. The relative play out delay metric is based on a result of a comparison of a difference between audio play out time values and a difference between audio generation time values at the source.

In another particular aspect, an apparatus includes means for storing a plurality of audio packets that are received with varying delay from a first device. The apparatus also includes means for dropping one or more audio packets from the means for storing based on a relative play out delay metric satisfying a threshold. The relative play out delay metric is based on a result of a comparison of a difference between audio play out time values and a difference between audio generation time values at the source.

In another particular aspect, a non-transitory, computer readable medium includes instructions that, when executed by a processor, cause the processor to perform operations including storing a plurality of audio packets received from a second device at a de-jitter buffer of a first device. The operations also include dropping one or more audio packets from the de-jitter buffer based on a relative play out delay metric satisfying a threshold. The relative play out delay metric is based on a result of a comparison of a difference between audio play out time values and a difference between audio generation time values at the source.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1A:
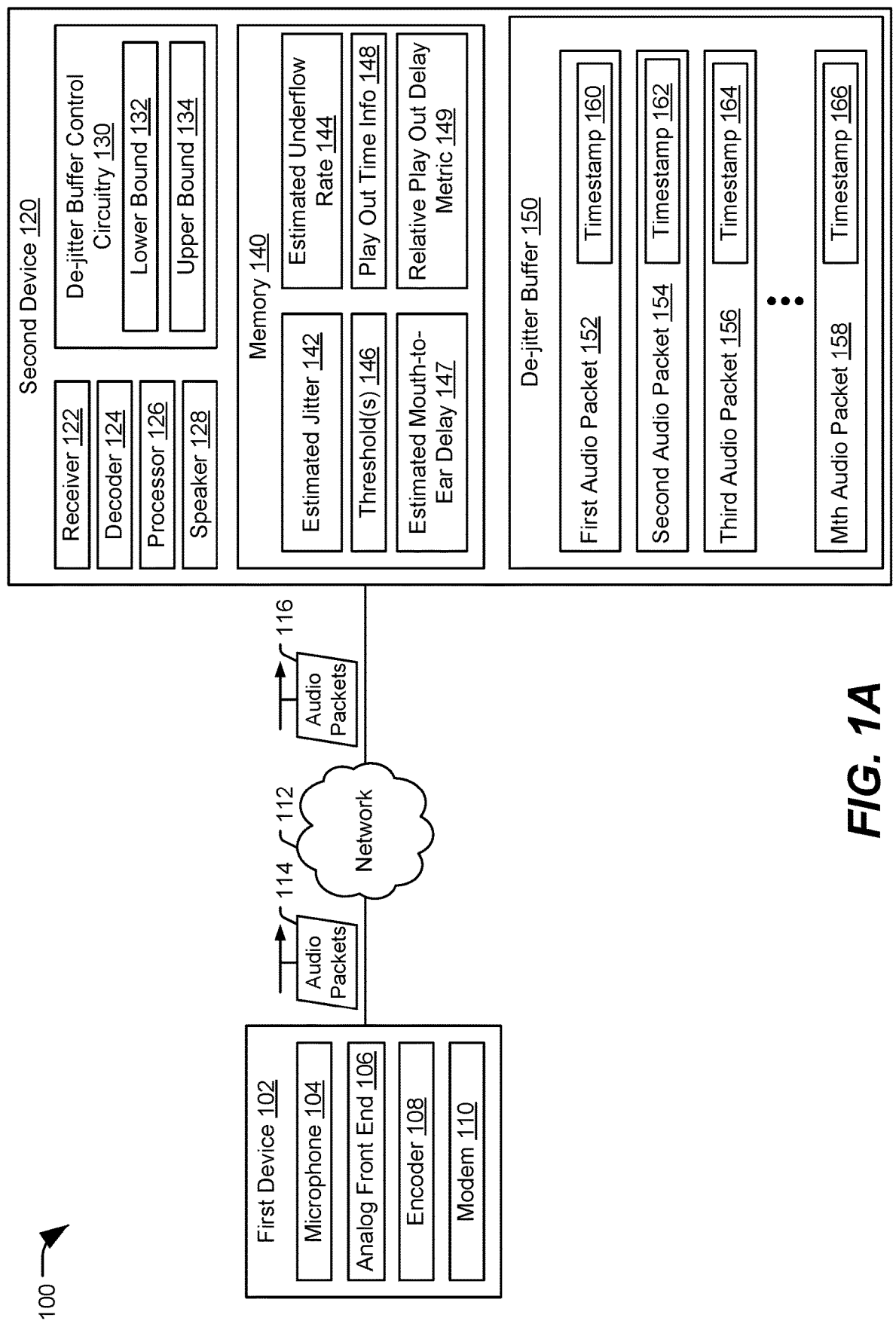
FIG. 1A is a block diagram of a particular illustrative aspect of a system to adjust an operating parameter of a de-jitter buffer.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device.

The present disclosure describes systems, devices, and methods for adjusting operating parameters of a de-jitter buffer. For example, the operating parameters may include delay timing parameters (e.g., "bounds" of a target delay range associated with the de-jitter buffer) or audio packet drop parameters, as non-limiting examples. Because audio packets may be received via a packet-switched network with varying delays (e.g., jitters) with respect to an order in which the audio packets were transmitted, the de-jitter buffer may be used to store and reorder the received audio packets to enable play out (e.g., generation of audio outputs based on the audio packets) of the audio packets in the correct order. Adjusting the operating parameters of the de-jitter buffer may improve output speech quality, reduce a mouth-to-ear delay, or achieve a better balance between output speech quality (impacted or degraded by the underflow associated with the de-jitter buffer) and mouth-to-ear delay.

To illustrate, a de-jitter buffer has target delay after which a first packet of a talk spurt is played out of the de-jitter buffer. An adaptive de-jitter buffer can "adapt" (e.g., change or modify) a target delay value between a delay lower bound and a delay upper bound that is greater than the delay lower bound. As a particular example, the lower bound may be 20 milliseconds (ms) and the upper bound may be 80 ms. When a first packet of a talk spurt is received, the target delay value may be selected from the range between the lower bound and the upper bound based on previously estimated jitter, a previously estimated underflow rate, or both. The target delay represents the amount of time the de-jitter buffer buffers a first packet of a group of packets, such as a talk spurt, before play out of the first packet.

The target delay value may be changed (e.g., adapted) for packets at the beginning of other talk spurts based on an estimated underflow rate associated with the packets. For example, if the estimated underflow rate is below a target underflow rate, the target delay value may be decreased by a first delta value, and if the estimated underflow rate is greater than the target underflow rate, the target delay value may be increased by a second delta value (which may be different or the same as the first delta value). However, the target delay value may not be decreased below the lower bound or increased above the upper bound.

Systems, devices, and methods disclosed herein may adjust the bounds (e.g., the lower bound and the upper bound) to improve performance of the de-jitter buffer. To illustrate, based on an estimated underflow rate, an estimated jitter associated with the audio packets, or both, a first operating parameter (e.g., a value of a bound of the target delay range) may be adjusted by de-jitter buffer control circuitry. For example, the de-jitter buffer control circuitry may reduce the value of a lower bound (e.g., a minimum target delay value) associated with initiating play out of a first audio packet of a group of audio packets from the de-jitter buffer based on a determination that an estimated jitter associated with the audio packets fails to satisfy a first threshold (e.g., a first jitter threshold). The estimated jitter may indicate an estimated delay variation between an expected receipt time and an actual receipt time of audio packets at the receiving device, and the estimated jitter may be determined based on a particular number of previously received audio packets. To illustrate, jitter refers to variations in delay associated with receipt of the audio packets as compared to generation time of the audio packets (and expected receipt times). If audio packets i and j, generated at a source device at times $T_i$ and $T_j$, are received at times $t_i$ and $t_j$, then the jitter between the audio packets i and j is calculated as $|(t_i-t_j)-(T_i-T_j)|$ where $T_i$, $T_j$, $t_i$, and $t_j$ have the same unit (e.g., ms). For example, if audio packets are generated every 20 ms, but a second audio packet is received 10 ms after receipt of a first audio packet and a third audio packet is received 35 ms after receipt of the second audio packet, the variation in the delay (e.g., 10 ms between the first and second audio packets and 15 ms between the second and the third audio packets) is referred to as jitter.

Additionally or alternatively, the de-jitter buffer control circuitry may reduce a value of the lower bound based on a determination that an estimated underflow rate associated with the de-jitter buffer fails to satisfy a second threshold (e.g., a first underflow threshold). The de-jitter buffer may be associated with a particular amount of time between play out of consecutive audio packets from the de-jitter buffer. For example, a de-jitter buffer may play out audio packets of a group of audio packets at a particular rate (e.g., a rate of one audio packet every 20 ms, so that the play out rate is the same as the audio packet generation rate at the source, as a non-limiting example). An underflow condition occurs when the particular amount of time expires after play out of an audio packet without receipt of the next audio packet. For example, a second audio packet may be played out 20 ms after play out of a first audio packet, and if a third audio packet is not in the de-jitter buffer 20 ms after play out of the second audio packet, an underflow condition occurs. Underflow refers to audio packets that arrive after a particular time (that it, the next audio packet is not lost during the transmission). An instantaneous underflow rate may refer to the rate of underflow occurrences associated with a particular number of audio packets. The underflow rate may be estimated based on a previous estimated underflow rate and an instantaneous underflow rate according to the following infinite impulse response (IIR) equation:

$$UF(n)=p \times UF(n-1)+(1-p) \times IUF \quad \text{(Equation 1)}$$

where UF is the underflow rate, IUF is the instantaneous underflow rate, and p is a number greater than 0.95. When audio packets are received at the receiving device with low arrival jitter (which may result in a low underflow rate), reducing the lower bound may reduce the delay to play out the first audio packet of a group of audio packets and the rest of the audio packets of the group from the de-jitter buffer (e.g., an amount of time that the group of audio packets is buffered in the de-jitter buffer) without significantly increasing the underflow rate. The reduction in the delay of the de-jitter buffer results in the reduction of the mouth-to-ear delay.

As another example, the de-jitter buffer control circuitry may adjust the lower bound in response to the estimated jitter satisfying a third threshold (e.g., a second jitter threshold), the estimated underflow rate satisfying a fourth threshold (e.g., a second underflow threshold), or both. For example, the de-jitter buffer control circuitry may increase a value of the lower bound in response to a determination that the estimated jitter is greater than (or equal to) the third threshold, a determination that the estimated underflow rate is greater than the fourth threshold, or both. Increasing the value of the lower bound may increase the delay to play out the first audio packet of a group of audio packets and the rest of the audio packets of the group from the de-jitter buffer, which may allow more audio packets to be received and played out on time (e.g., based on a designated play out rate) in high jitter conditions to decrease the underflow rate.

In some implementations, the de-jitter buffer control circuitry may adjust a second operating parameter based on the estimated underflow rate and a particular delay (e.g., an estimated mouth-to-ear delay or a measured mouth-to-ear delay). For example, the de-jitter buffer control circuitry may increase a value of the upper bound (e.g., a maximum target delay value associated with the de-jitter buffer) in response to the estimated underflow rate being greater than (or equal to) a fifth threshold (e.g., a third underflow threshold) and the particular delay failing to satisfy a sixth threshold (e.g., a first delay threshold). Increasing the value of the upper bound may increase the delay to play out the first audio packet of a group of audio packets and the rest of the audio packets of the group from the de-jitter buffer, which may allow more audio packets to be received and played out on time, which reduces the underflow rate while maintaining the particular delay at a particular level (e.g., less than the first delay threshold). The value of the upper bound may also be decreased, as further described herein. The first delay threshold (e.g., a maximum allowable mouth-to-ear delay) may be different for different network types. For example, a maximum allowable mouth-to-ear delay (e.g., the first delay threshold) associated with voice over Long Term Evolution (VoLTE) networks may be 400 ms (e.g., because LTE specifies QoS requirements), and a maximum allowable mouth-to-ear delay (e.g., the first delay threshold) associated with voice over Wi-Fi (VoWiFi) networks may be 500 ms (e.g., due to lessened quality expectations associated with VoWiFi).

In a particular implementation, de-jitter buffer control circuitry determines a directly estimated mouth-to-ear delay based on an audio transmit path delay, a real-time transport protocol (RTP)-to-RTP delay, a de-jitter buffer delay, and an audio receive path delay. The directly estimated mouth-to-ear delay may be calculated if the source device and the receiving device use a common timestamp clock. For example, the common timestamp clock may be based on a global positioning satellite (GPS) signal, a first clock signal associated with an LTE network (e.g., "SystemTimeInfo-CDMA2000" in system information block 8 (SIB8)), a second clock signal associated with an LTE network (e.g., "TimeInfo" in SIB16), or another common clock signal. A time based on the common clock is represented by a received network time protocol (NTP) timestamp in a RTP control protocol (RTCP) packet. The various delays (e.g., the audio transmit path delay, the RTP-to-RTP delay, the de-jitter buffer delay, and the audio receive path delay) may be determined based on timestamp values determined at the source device (and indicated by or appended to the RTP packets) along with the NTP timestamp in the received RTCP packet and time values (such as dequeue times, decode times, play out times, etc.) determined at the receiving device.

Alternatively, if the source device and the receiving device do not use a common timestamp clock, the de-jitter buffer control circuitry may determine an indirectly estimated mouth-to-ear delay. For example, the audio transmit path delay may be estimated based on local audio transmit path delay (at the receiving device) and the RTP-to-RTP delay may be estimated as half of an RTP round trip time derived from timing information contained in the received RTCP packets. The other values (e.g., de-jitter buffer delay and audio receive path delay) are calculated by the receiving device since de-jitter buffer delay and the audio receive path delay occur at the receiving device.

Changing the lower bound and the upper bound may improve performance of the de-jitter buffer in various conditions, as further described herein. As an example, during a phone call via a voice over long term evolution (VoLTE) network, if a connected discontinuous reception (CDRX) mode is off (or set to 20 ms) and the estimated jitter is relatively low (e.g., fails to exceed a first particular threshold), the estimated underflow rate is relatively low (e.g., fails to exceed a second particular threshold), or both, adjusting the lower bound to 20 ms and the upper bound to 80 ms may enable efficient de-jitter buffer performance (e.g., the bound values represent a tradeoff between output speech quality and mouth-to-ear delay for the network conditions of the phone call). As another example, during a second phone call via the VoLTE network, if the CDRX mode is set to 40 ms and the estimated jitter is relatively large (e.g., exceeds a third particular threshold), the estimated underflow rate is relatively high (e.g., exceeds a fourth particular threshold), or both, adjusting the lower bound to 40 ms and the upper bound to 100 ms may enable efficient de-jitter buffer performance (e.g., the bound values represent a tradeoff between output speech quality and mouth-to-ear delay for the network conditions of the second phone call). Also due to mobility of the mobile device, during one phone call, the mobile device might move from a "good" LTE channel condition (e.g., associated with a low jitter) to a "bad" LTE channel condition (e.g., associated with a high jitter) and vice versa, and dynamically adjusting the upper bound and lower bound may improve performance of the de-jitter buffer and therefore the user experience.

As another example, during phone calls via a voice over Wi-Fi (VoWiFi) network, such as a network that is compliant with one or more Institute of Electrical and Electronics Engineers (IEEE) 802.11 standards, the channel conditions can vary wildly. To illustrate, during a third phone call, if the estimated jitter is relatively large, the estimated underflow rate is relatively high, or both (e.g., in "bad" channel conditions), the lower bound may be set to 40 ms (or higher), and the upper bound may be set to 100 ms (or higher). During a fourth phone call, if the estimated jitter is relatively small, the estimated underflow rate is relatively low, or both (e.g., in "good" channel conditions), the lower bound may be set to 20 ms, and the upper bound may be set to 80 ms. Thus, adjusting the lower bound and the upper bound based on network conditions (e.g., as indicated by an estimated underflow rate, an estimated jitter rate, etc.) can substantially improve the performance of an adaptive de-jitter buffer. Also due to the mobility of the mobile device, during one phone call, the mobile device might move from a "good" Wi-Fi channel condition to a "bad" Wi-Fi channel condition and vice versa, or the mobile device may perform a handover from Wi-Fi to LTE and vice versa, and dynamically adjusting the upper bound and lower bound may improve performance of the de-jitter buffer and therefore the user experience.

In another particular implementation, the de-jitter buffer control circuitry may be configured to cause one or more audio packets to be dropped from the de-jitter buffer circuitry based on a "relative play out delay" metric satisfying a seventh threshold (e.g., a second delay threshold). The relative play out delay metric corresponds to a relative play out delay associated with play out of audio packets from the de-jitter buffer. In some implementations, the audio packets may correspond to multiple different talk spurts. As a non-limiting example, the relative play out delay metric may be determined based on a last audio packet associated with a first talk spurt and one or more audio packets associated with a second talk spurt. In other implementations, the audio packets may correspond to a single talk spurt. The relative play out delay metric may be based on a result of a comparison of a difference between audio play out time values and a difference between audio generation time values at the source (converted to time units, such as seconds, milliseconds, etc., based on a timestamp clock frequency if the generation time values are indicated by timestamps), as further described herein. The amount (i.e., the number or count) of audio packets that are dropped may be limited by one or more constraints, as further described herein. By dropping one or more audio packets, a mouth-to-ear delay associated with play out of remaining audio packets (e.g., audio packets in the de-jitter buffer that are not dropped) may be reduced without significant loss of output quality. Dropping audio packets may improve performance of the receiving device during long handoff procedures (e.g., at the receiving device, the source device, or both). Additionally or alternatively, dropping audio packets may improve performance of the receiving device during network outages. The long handoff procedures and the network outages can cause a large number of packets to be transferred in a burst (e.g., a chunk) or can cause multiple audio packets to be received after significant delays.

Referring to FIG. 1A, a particular illustrative aspect of a system that adjusts an operating parameter of a de-jitter buffer is shown and generally designated 100. The system 100 includes a first device 102, a network 112, and a second device 120. Although two devices are illustrated as being included in the system 100, in other implementations the system 100 may include more than two devices. The first device 102 and the second device 120 may include communication devices, a base station, headsets, decoders, smart phones, cellular phones, mobile communication devices, laptop computers, computers, tablets, personal digital assistants (PDAs), set top boxes, video players, entertainment units, display devices, televisions, gaming consoles, music players, radios, digital video players, digital video disc (DVD) players, tuners, cameras, navigation devices, vehicles, on-board components of vehicles, or combinations thereof.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

The first device 102 may include a microphone 104, analog front end circuitry 106, an encoder 108, and a modem 110. The microphone 104 may be configured to receive an audio input, such as speech from a person talking, and to generate an input audio signal. The analog front end circuitry 106 may be configured to process the input audio signal to generate a sequence of audio frames, such as performing filtering or other operations on the input audio signal. Each audio frame may include samples of an analog audio signal. The analog front end circuitry 106 may include hardware, software, or a combination thereof. The sequence of audio frames may correspond to audio of a communication session, such as a voice call, as a particular example. The encoder 108 may be configured to encode a sequence of audio frames to generate a sequence of audio packets. Each of the audio packets may include at least a portion of one or more audio frames. In some implementations, the audio frames are encoded as high-band parameters and an encoded low-band signal. In a particular implementation, each of the audio packets (or the audio frames) has a fixed size, and an amount of bandwidth (e.g., number of bits of an audio frame) allocated to the encoded low-band signal and to the high-band parameters can be dynamically adjusted from audio frame to audio frame.

The modem 110 may be configured to encapsulate the audio packets in data packets, such as real-time transport protocol (RTP) packets, and to initiate transmission of the data packets containing the audio packets, such as via a transmitter or a transceiver of the first device 102. Each of the data packets (e.g., each RTP packet) may contains a sequence number and a timestamp corresponding the relative time instance of the first speech frame in the data packet at the source device. The timestamps may be determined based on a common clock (e.g., a clock used by the first device 102 and the second device 120) or corresponding local clocks, as further described herein. These two parameters (e.g., the sequence number and the timestamp) are used by a de-jitter buffer in a receiving device, as further described herein. Although the RTP packetization is described as being performed by the modem 110, in other implementations, the first device 102 may include an ADSP processor or other dedicated circuitry configured to encapsulate the audio packets in the RTP packets. Additionally, the first device 102 may include a processor and a memory (not shown), the memory storing instructions that, when executed by the processor, cause the processor to perform one or more of the operations described herein.

The first device 102 may be configured to generate a plurality of audio packets 114 and to transmit the plurality of audio packets 114 (encapsulated in a plurality of data packets) via the network 112. The plurality of audio packets 114 may be sent individually or as groups of audio packets. The plurality of audio packets 114 may be associated with a first order. For example, each audio packet may include or correspond to a timestamp, and the first order may correspond to a temporal order of the plurality of audio packets 114 as indicated by the timestamps. Although timestamps are described herein, any type of timing information or ordering information may be used to indicate an order of audio packets.

The network 112 may include a packet-switched network. For example, the network 112 may include a VoWiFi network (also referred to herein as a Wi-Fi network or an IEEE 802.11-compliant network), a VoLTE network (also referred to herein as an LTE network), or another packet-switched network. The network 112 may include one or more devices, such as one or more media gateways, that are configured to receive the audio packets and to transmit the audio packets through the network 112 to the second device 120.

Consecutive audio packets transmitted separately through the network 112 may incur different network delays (e.g., delays travelling through the network), also referred to as jitter. Additionally or alternatively, one or more audio packets may be received out of order. For example, a first audio packet may travel through the network 112 via a first path that is longer than a second path through the network 112 traveled by a second audio packet. Accordingly, the second audio packet may arrive at the second device 120 before the first audio packet, even though the first audio packet is transmitted prior to the second audio packet. Thus, the plurality of audio packets 114 (having a first order) may be transmitted by the first device 102 and may be received as a plurality of audio packets 116 (having a second order) at the second device 120.

In some implementations, the plurality of audio packets 116 includes fewer audio packets than the plurality of audio packets 114 due to one or more audio packets being lost (e.g., dropped or failed to be received by the second device 120 due to one or more network conditions or faults). The plurality of audio packets 116 may be associated with a second order that is different from the first order associated with the plurality of audio packets 114. For example, one or more audio packets of the plurality of audio packets 114 may have varying delays associated with arrival at the second device 120, causing the second order associated with the plurality of audio packets 116 to differ from the first order associated with the plurality of audio packets 114.

The second device 120 may include a receiver 122, a de-jitter buffer 150, de-jitter buffer control circuitry 130, a decoder 124, a processor 126, a speaker 128, and a memory 140. The receiver 122 may be configured to receive the plurality of audio packets 116 from the first device 102 (e.g., a source device) via the network 112. The plurality of audio packets 116 may be encapsulated within a plurality of data packets, and a modem (not illustrated) may be configured to extract the plurality of audio packets 116 from the plurality of data packets. The plurality of audio packets 116 (or audio frames decoded from the plurality of audio packets 116) may be stored in the de-jitter buffer 150. The decoder 124 may be configured to receive audio packets that are dequeued from the de-jitter buffer 150 and to decode the audio packets to generate audio frames (e.g., a decoded audio signal). The processor 126 may be configured to execute instructions stored at the memory 140 to perform one or more of the operations described herein. The processor 126 may be configured to generate an audio signal based on a decoded audio signal (e.g., based on one or more decoded audio frames based on one or more of the audio packets stored at the de-jitter buffer 150). The speaker 128 may be configured to play out (e.g., configured to output) an audio output based on the audio signal. In other implementations, the plurality of audio packets 116 may be decoded to generate a plurality of audio frames, and the plurality of audio frames may be stored at the de-jitter buffer 150 and played out to generate the audio output at the speaker 128.

The de-jitter buffer 150 may be configured to store the plurality of audio packets 116 received from the first device 102. For example, the de-jitter buffer 150 may store a first audio packet 152, a second audio packet 154, a third audio packet 156, and an Mth audio packet 158. Although four audio packets are illustrated, in other implementations, the de-jitter buffer 150 may store more than four or fewer than four audio packets. Because audio packets transmitted over network 112 can arrive with varying delays (e.g., jitter), the de-jitter buffer 150 may be used to store and reorder (e.g., by the processor 126, the de-jitter buffer control circuitry 130, or a de-jitter buffer manager) the received audio packets based on identifiers in the audio packets, such as timestamps or sequence numbers. For example, the first audio packet 152 may include or correspond to a first timestamp 160, the second audio packet 154 may include or correspond to a second timestamp 162, the third audio packet 156 may include or correspond to a third timestamp 164, and the Mth audio packet 158 may include or correspond to an Mth timestamp 166, where M is a positive integer. In a particular implementation, the audio packets 152-158 are generated in accordance with the AMR codec, and each speech frame contains 160 speech samples. If the value of the first timestamp 160 is 160, then the value of the second timestamp 162 is 320, the value of the third timestamp 164 is 480, and the value of the Mth timestamp 166 is M×160. These values are intended as non-limiting examples, and in other implementations, the timestamps 160-166 have different values.

Figure 1B:
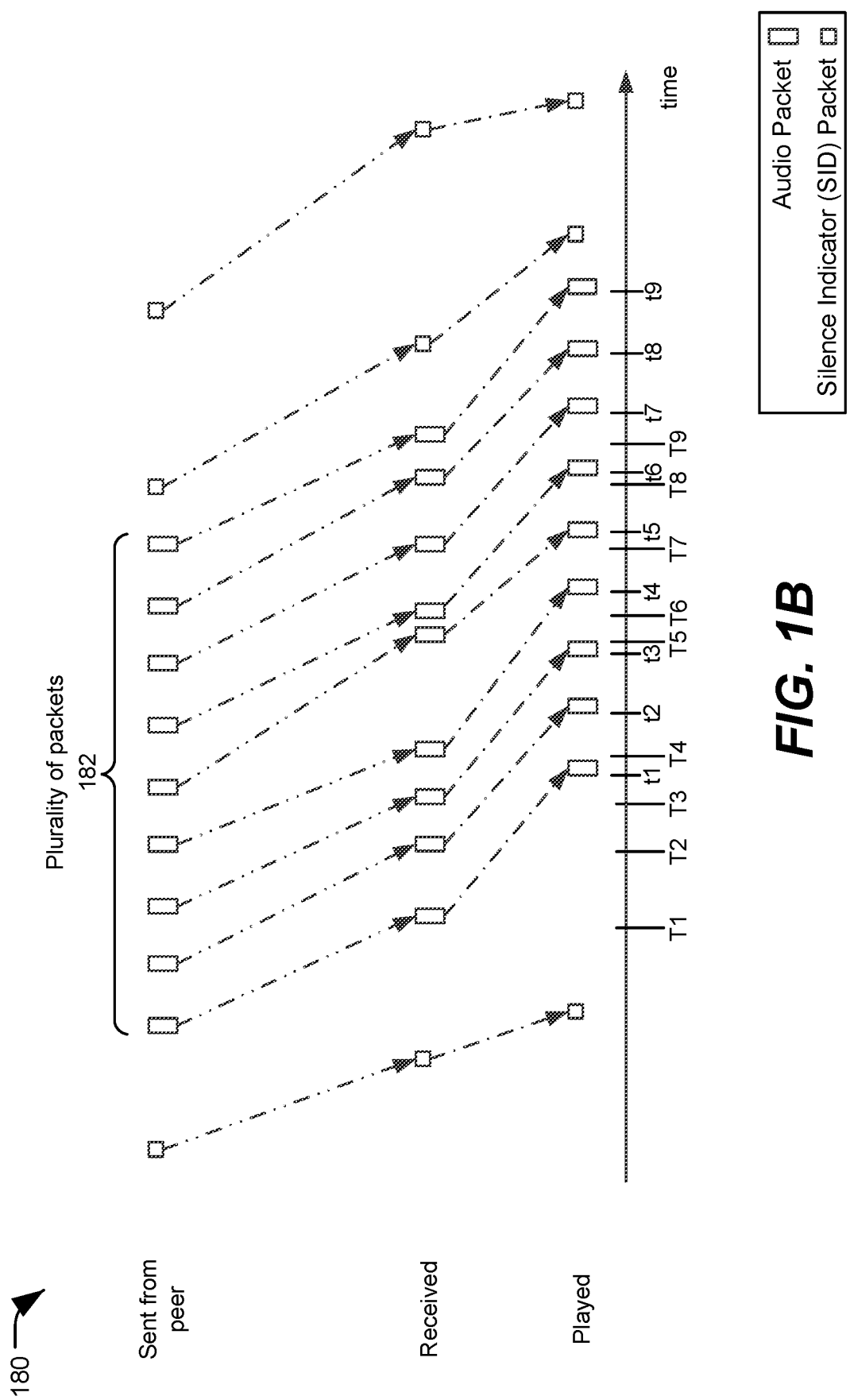
FIG. 1B illustrates an example of jitter associated with the system 100 of FIG. 1A.

The de-jitter buffer 150 may be configured to dequeue audio packets after a "target delay". In a particular implementation, a value of the target delay is within a range having a lower bound and an upper bound, as further described herein. The target delay, the lower bound, and the upper bound may be set to corresponding values that provide a balance between output quality (e.g., related to an underflow rate) and mouth-to-ear delay. To illustrate, FIG. 1B depicts an example of a timing diagram 180 of audio packet reception and audio packet play out associated with a first target delay. As illustrated in FIG. 1B, a plurality of audio packets 182 may be generated and transmitted from the first device 102 to the second device 120. The plurality of audio packets 182 may correspond to a talk spurt. As used herein, a talk spurt refers to a "burst" of speech, such as a syllable, a word, a phrase, etc.

As illustrated in FIG. 1B, different talk spurts may be separated by one or more silence indicator (SID) packets. The timing of the SID packets is illustrative and is not to be construed as limiting. Each audio packet of a plurality of a plurality of audio packets 182 may be generated (or transmitted) at a fixed interval (e.g., each audio packet may be generated (or transmitted) 20 ms after the previous audio packet). However, reception of audio packets may occur with varying delays. For example, the audio packets may be received at times T1-T9. Time intervals (e.g., amounts) between reception of two consecutive audio packets may be different. For example, the amount of time between reception of a first audio packet (at time T1) and reception of a second audio packet (at time T2) may be different from the amount of time between reception of a fourth audio packet (at time T4) and reception of a fifth audio packet (at time T5). Audio packets may be played out (e.g., dequeued and decoded into audio frames of an audio output signal) after a first target delay. In FIG. 1B, the target delay corresponds to a difference between time t1 and time T1. Because the target delay adds to an amount of time between receipt of an audio packet and play out of the audio packet, the target delay increase may increase a mouth-to-ear delay associated with the audio packets.

Figure 1C:
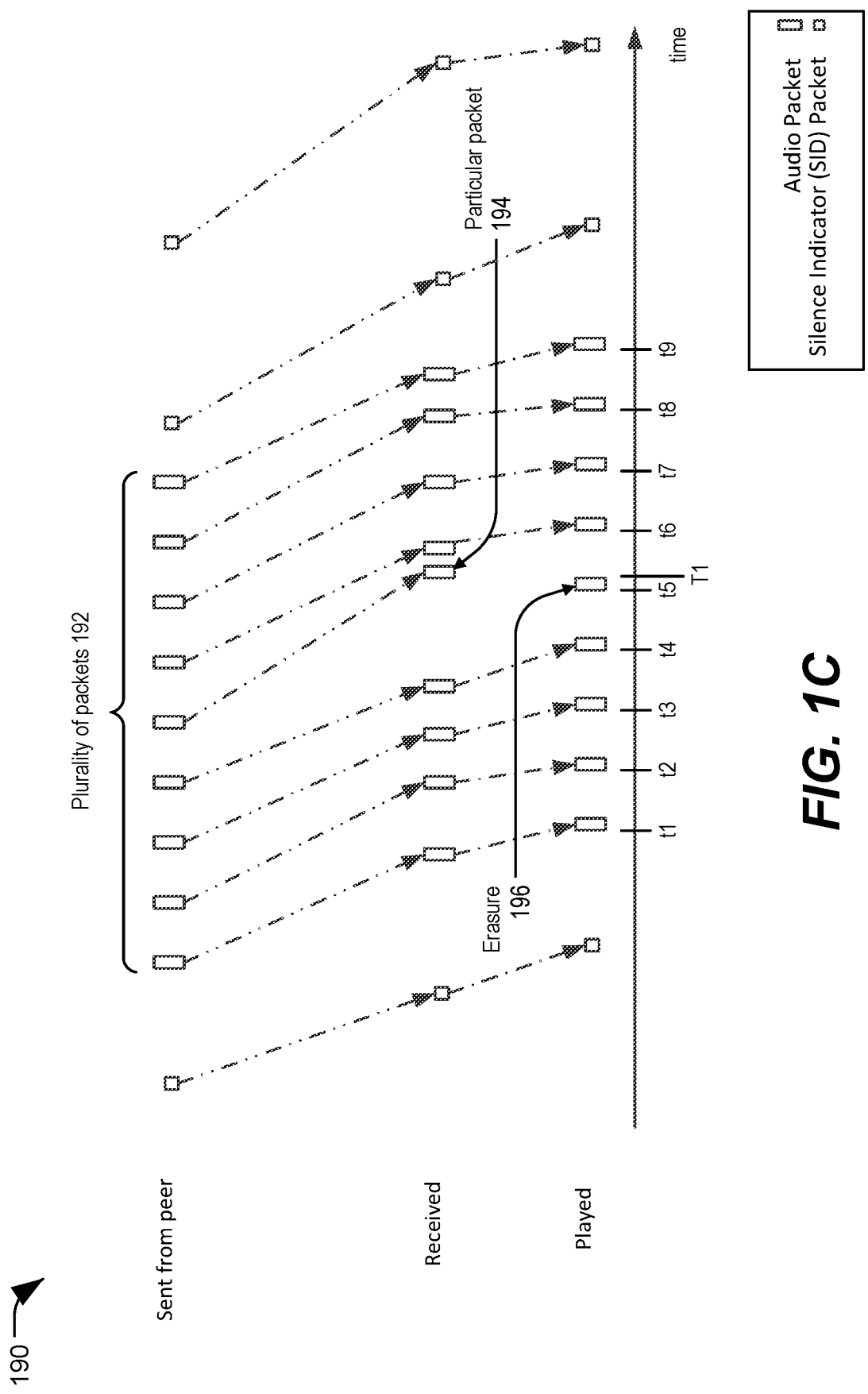
FIG. 1C illustrates an example underflow associated with the system 100 of FIG. 1A.

FIG. 1C illustrates an example of a timing diagram 190 of underflow in the system 100. In FIG. 1C, a plurality of audio packets 192 are generated and transmitted from the first device 102 to the second device 120. Audio packets corresponding to different talk spurts may be separated by SID packets. The timing of the SID packets is illustrative and is not to be construed as limiting. Audio packets stored at the de-jitter buffer 150 may be played out after a second target delay. The second target delay corresponds to a difference between time t1 and a time of receipt of the corresponding audio packet. Because the second target delay is less than the first target delay associated with FIG. 1B, play out of the audio packets in FIG. 1C is initiated faster than play out of the audio packets in FIG. 1B, which reduces a mouth-to-ear delay described with reference to FIG. 1C as compared to the mouth-to-ear delay associated with FIG. 1B.

In the timing diagram 190, a particular audio packet 194 is received at a time T1 that occurs after a time t5 associated with play out of the particular audio packet 194. Because the particular audio packet 194 was not available in the de-jitter buffer 150 for play out at time t5 (but is later received, as compared to being lost), a packet erasure 196 (or other error condition) occurs at time t5. For example, the second device 120 may interpolate previously received packets to generate a replacement packet for play out at time t5. Failure of the particular audio packet 194 to be available in the de-jitter buffer 150 at time t5 (e.g., receipt of the particular audio packet after time t5) represents an underflow condition. An instantaneous underflow rate associated with the timing diagram 190 is equal to 1/9 (e.g., 11.1%).

The de-jitter buffer control circuitry 130 may be configured to adjust an operating parameter associated with the de-jitter buffer 150 based at least in part on an estimated jitter 142 associated with the plurality of audio packets 116, an estimated underflow rate 144 associated with the plurality of audio packets 116, or both. Adjusting the operating parameter may adjust the target delay value or a range of permissible target delay values (thereby adjusting an amount of delay between receipt and play out of a first audio packet of a talk spurt from the de-jitter buffer 150), a number (e.g., a quantity) of audio packets that are dropped from the de-jitter buffer 150, or a combination thereof.

As a first example, the operating parameter may include or correspond to a lower bound 132 associated with the de-jitter buffer 150. The lower bound 132 may correspond to a minimum delay (e.g., a minimum permissible target delay value) associated with play out of a first audio packet of a talk spurt from the de-jitter buffer 150. The de-jitter buffer control circuitry 130 may be configured to compare the estimated jitter 142 to a first jitter threshold of thresholds 146 and to compare the estimated underflow rate 144 to a first underflow threshold (U1) of the thresholds 146. The de-jitter buffer control circuitry 130 may be configured to adjust the lower bound 132 based on results of the comparisons. As a non-limiting example, the de-jitter buffer control circuitry 130 may be configured to decrease the lower bound 132 in response to the estimated jitter 142 failing to satisfy the first jitter threshold (J1) and the estimated underflow rate 144 failing to satisfy the first underflow threshold U1. Alternatively, the de-jitter buffer control circuitry 130 may increase the lower bound 132, as further described herein. As used herein, a value may satisfy a threshold when the value exceeds (or is greater than or equal to) the threshold. A value may fail to satisfy the threshold when the value is less than the threshold.

The estimated jitter 142 may correspond to an average amount of delay variation (jitter) of each received audio packet with respect to a most recently received audio packet at the second device 120. For example, a second audio packet may be received 22 ms after receipt of a first audio packet, and a third audio packet may be received 19 ms after receipt of the second audio packet. In some implementations, jitter may also be referred to as instantaneous packet delay variation.

In some implementations, the estimated jitter 142 may correspond to a value that is based on multiple jitter values, such as an average or mean jitter value corresponding to N audio packets. In other implementations, the estimated jitter 142 may correspond to Interarrival Jitter as described in Request for Comments (RFC 3550) associated with "RTP: A Transport Protocol for Real-Time Applications", a maximum value, a statistical mode value, or another value. The estimated jitter 142 may be based on a particular number N of previously received audio packets. For example, the estimated jitter 142 may be determined based on 50 previously received audio packets (e.g., N=50). The estimated jitter 142 may be determined by the processor 126, by the de-jitter buffer control circuitry 130, or by another component of the second device 120.

The estimated underflow rate 144 may correspond to a rate that underflow conditions occur during receipt of a particular number of audio packets. The estimated underflow rate 144 may correspond to an estimated underflow rate (e.g., an IIR filtered version of an instantaneous underflow rate, as described above) for a particular number of audio packets. To illustrate, if the instantaneous underflow rate is determined for receipt of 6 audio packets, and if one of the 6 audio packets is received after lapse of a particular time period from play out of the preceding audio packet, the instantaneous underflow rate is 1/6 (e.g., approximately 0.166667). The estimated underflow rate 144 may be determined based on the instantaneous underflow rate using Equation 1. The estimated underflow rate 144 may be determined by the processor 126, by the de-jitter buffer control circuitry 130, or by another component of the second device 120. Although described as determined with respect to audio packets, the estimated underflow rate 144 and the estimated jitter 142 may be determined with respect to audio frames (e.g., the calculations and determinations can be performed on a per-frame basis).

The first jitter threshold J1 may be set to a value that represents a trade-off between mouth-to-ear delay associated with play out of audio packets and audio quality (e.g., based on underflow/dropped audio packets). The first underflow threshold U1 may represent a percentage of a target underflow threshold (e.g., a maximum allowable underflow threshold). For example, if the target underflow threshold is U2, then the first underflow threshold U1 may be equal to 0.8*U2, as a non-limiting example, where U2 is a positive integer. The lower bound 132 may be adjusted (e.g., reduced) by a particular amount (delta1) in response to the estimated jitter 142 failing to satisfy the first jitter threshold and the estimated underflow rate 144 failing to satisfy the first underflow threshold. Each of N, J1, U1, and delta1 may be adjustable. For example, N, J1, U1, delta1, or a combination thereof, may be adjusted by the processor 126 based on one or more settings, based on a type of network used for communications (e.g., VoLTE or VoWiFi, as non-limiting examples), based on user settings (e.g., settings in a user profile, settings entered by a user, etc.), or a combination thereof. Alternatively, N, J1, U1, delta1, or a combination thereof may be preprogrammed values (e.g., preset or default values) stored at the memory 140.

The de-jitter buffer control circuitry 130 may be configured to compare the estimated jitter 142 to a second jitter threshold (J2) of the thresholds 146 and to compare the estimated underflow rate 144 to a second underflow threshold (e.g., the target underflow threshold U2) of the thresholds 146. The de-jitter buffer control circuitry 130 may be configured to adjust (e.g., increase) the lower bound 132 based on the estimated jitter 142 satisfying the second jitter threshold J2, the estimated underflow rate 144 satisfying the second underflow threshold U2, or both. The second jitter threshold J2 and the second underflow threshold U2 may each be adjustable or preconfigured.

As a second example, the operating parameter may also include or correspond to an upper bound 134 associated with the de-jitter buffer 150. The upper bound 134 may correspond to a maximum delay (e.g., a maximum permissible target delay value) associated with initiating play out of a first audio packet of a talk spurt (or other group of audio packets) from the de-jitter buffer 150. The de-jitter buffer control circuitry 130 may be configured to adjust the upper bound 134 in addition or in the alternative to adjusting the lower bound 132.

To illustrate, the de-jitter buffer control circuitry 130 may be configured to adjust the upper bound 134 by a second particular amount (delta2) in response to the estimated underflow rate 144 satisfying a third underflow threshold (U3) which may be greater than or equal to the second underflow threshold U2, such that an estimated mouth-to-ear delay 147 associated with an audio output based on one or more audio packets in the de-jitter buffer 150 fails to satisfy a delay threshold (e.g., the first delay threshold) of the thresholds 146. For example, the de-jitter buffer control circuitry 130 may increase the upper bound 134 in response to the estimated underflow rate 144 satisfying the third underflow threshold U3 so long as, after the increase, the estimated mouth-to-ear delay 147 fails to satisfy the first delay threshold. In some implementations, increasing the upper bound 134 may increase the estimated mouth-to-ear delay 147. The estimated mouth-to-ear delay 147 may include or correspond to a "directly estimated" mouth-to-ear delay (e.g., a first mouth-to-ear delay) or an "indirectly estimated" mouth-to-ear delay (e.g., a second mouth-to-ear delay).

As a third example, the de-jitter buffer control circuitry 130 may be configured to decrease the upper bound 134 under particular conditions, subject to the upper bound 134 being greater than the lower bound 132. To illustrate, the de-jitter buffer control circuitry 130 may be configured to decrease the upper bound 134 by a third particular amount (delta3) in response to a particular metric (e.g., an estimated mouth-to-ear delay) being larger than the first delay threshold (e.g., a maximum allowable mouth-to-ear delay). In another particular implementation, the de-jitter buffer control circuitry 130 may be configured to decrease the upper bound 134 if the estimated underflow rate 144 is less than or equal to a fourth underflow threshold (U4). In some implementations, the fourth underflow threshold is a percentage of the target underflow threshold (e.g., the second underflow threshold U2). For example, the upper bound 134 may be decreased if the estimated underflow rate 144 is less than or equal to 10% of the target underflow threshold (U2). In another particular implementation, the de-jitter buffer control circuitry 130 may be configured to decrease the upper bound 134 based on the lower bound 132 being decreased in order to maintain a "reasonable" range of permissible target delay values or to reduce an overall mouth-to-ear delay in situations of high network quality, as indicated by the decrease to the lower bound 132. The upper bound 134 and the lower bound 132 may be decreased by the same amount or by a different amount.

As a fourth example, the de-jitter buffer control circuitry 130 may be configured to drop one or more audio packets from the de-jitter buffer 150 based on a relative play out delay metric 149 satisfying the second delay threshold. The relative play out delay metric 149 may be based on a difference between audio play out time values (based on the play out time information 148) and a difference between audio generation times (based on one or more of the timestamps 160-166 converted to time units based on a timestamp clock frequency) as further described herein.

During operation, the first device 102 may generate and transmit the plurality of audio packets 114 via the network 112. The second device 120 may receive the plurality of audio packets 116 via the network 112 (e.g., a packet-switched network). As described above, because each audio packet may travel a different path through the network 112, audio packets may be received with varying delay, one or more audio packets may be lost or otherwise not properly received at the second device 120, or a combination thereof. Thus, the plurality of audio packets 116 may include fewer audio packets than the plurality of audio packets 114, the plurality of audio packets 116 may be associated with a different order than the plurality of audio packets 114, and audio packets of the plurality of audio packets 116 may be received with varying delays (e.g., jitter).

The processor 126 or the de-jitter buffer control circuitry 130 (or another component of the second device 120) may determine the estimated jitter 142 and the estimated underflow rate 144. For example, the estimated jitter 142 may correspond to an average jitter (or a maximum value, a statistical mode value, or another value) associated with the particular number N previously played out audio packets, and the estimated underflow rate 144 may correspond to a percentage of audio packets that correspond to an underflow condition for the particular number N previously played out audio packets.

The de-jitter buffer control circuitry 130 may dynamically adjust (e.g., modify) the lower bound 132 (e.g., a first operating parameter) based on the estimated jitter 142, the estimated underflow rate 144, or both. To illustrate, the de-jitter buffer control circuitry 130 may dynamically adjust the lower bound 132 based on a comparison of the estimated jitter 142 to the first jitter threshold J1 and a comparison of the estimated underflow rate 144 to the first underflow threshold U1. As an example, the de-jitter buffer control circuitry 130 may be configured to adjust the lower bound 132 by decreasing the lower bound 132 by an amount delta1 in response to the estimated jitter 142 failing to satisfy the first jitter threshold J1 and the estimated underflow rate 144 failing to satisfy the first underflow threshold U1. To illustrate, the de-jitter buffer control circuitry 130 may decrease the lower bound 132 by 20 ms in response to the estimated jitter 142 (based on 50 previously played out audio packets) being less than 10 ms and the estimated underflow rate 144 failing to exceed a threshold underflow rate of 0.08 (e.g., 80% of a target underflow rate of 0.1 associated with VoLTE, as a non-limiting example). The lower bound 132 may be further reduced by the same amount or a different amount, subject to the lower bound 132 being greater than or equal to 0 ms, if jitter estimated after the first reduction of the lower bound 132 fails to satisfy the first jitter threshold, if the underflow rate estimated after the first reduction of the lower bound 132 fails to satisfy the first underflow threshold, or both. Reducing the lower bound 132 may account for low jitter situations, such as when a connected discontinuous reception (CDRX) mode is off or is associated with a small configuration value (e.g., 20 ms), when the second device 120 is close to a cell in an LTE network, or when the second device 120 is coupled to a VoWiFi network having little contention or interference, as non-limiting examples.

In other implementations, the de-jitter buffer control circuitry 130 may decrease the lower bound 132 by a different amount based on satisfaction of other thresholds. For example, the de-jitter buffer control circuitry 130 may decrease the lower bound 132 by a second amount based on an estimated jitter that corresponds to a different number of previously played out audio packets and based on an estimated underflow rate that fails to satisfy a different target underflow rate (e.g., a target underflow rate associated with a different type of network, such as a VoWiFi network). The de-jitter buffer control circuitry 130 may not decrease the lower bound 132 below zero. In a particular implementation, the particular number of previously played out audio packets N, the first jitter threshold J1, the first underflow threshold U1, and the increase amount delta1 are adjustable, such as by the processor 126 based on various settings or based on user input.

The de-jitter buffer control circuitry 130 may also dynamically adjust the lower bound 132 based on a comparison of the estimated jitter 142 to the second jitter threshold J2 and a comparison of the estimated underflow rate 144 to the second underflow threshold U2 (e.g., the target underflow threshold). For example, the de-jitter buffer control circuitry 130 may increase the lower bound 132 by the amount delta1 in response to the estimated jitter 142 satisfying the second jitter threshold J2 and the estimated underflow rate 144 satisfying the second underflow threshold U2. As a particular example, the de-jitter buffer control circuitry 130 may increase the lower bound 132 by 20 ms in response to the estimated jitter 142 exceeding 20 ms and the estimated underflow rate 144 being greater than or equal to 0.1. In other implementations, the configurable values may have other values.

Additionally, the de-jitter buffer control circuitry 130 may dynamically adjust the upper bound 134 based on a comparison of the estimated underflow rate 144 to the third underflow threshold U3 and a comparison of the estimated mouth-to-ear delay 147 to the first delay threshold. For example, the de-jitter buffer control circuitry 130 may increase the upper bound 134 based on the estimated underflow rate 144 satisfying the third underflow threshold and the estimated mouth-to-ear delay 147 failing to satisfy the first delay threshold. As a particular example, the de-jitter buffer control circuitry 130 may increase the upper bound 134 by 20 ms (or 40 ms) in response to the estimated underflow rate 144 exceeding 0.1 and the estimated mouth-to-ear delay 147 being less than 400 ms. In other implementations, other configurable values may be selected. The upper bound 134 may be increased until the estimated mouth-to-ear delay 147 is equal to the delay threshold, representing improvement in output quality at the expense of increased mouth-to-ear delay. Additionally or alternatively, if the estimated mouth-to-ear delay 147 satisfies the first delay threshold, the upper bound 134 may be reduced. For example, the upper bound 134 may be reduced if the estimated mouth-to-ear delay exceeds a target mouth-to-ear delay, if the estimated underflow rate 144 is less than a particular percentage of the second underflow threshold U2, or if the lower bound 132 is reduced. Adjusting the upper bound 134 may account for situations with large jitter variation, such as when the second device 120 is near a cell edge of an LTE network, when a CDRX mode has a large configuration value, or when the second device 120 is coupled to a VoWiFi network with high contention or interference, as non-limiting examples.

The lower bound 132 and the upper bound 134 (and any other adjusted values) may be adjusted for a "talk spurt". A talk spurt refers to a group of audio packets that correspond to an utterance or other speech increment. In a particular implementation, consecutive talk spurts are separated by a silence period (e.g., 500 ms or greater). In some implementations, adjusted parameter values for a talk spurt may be used as initial parameter values for a subsequent (e.g., next) talk spurt. Alternatively, the adjustable parameter values may be set to default values. The default values may be fixed (e.g., preprogrammed), or the default values may correspond to one or more settings of the second device 120. For example, there may be different default values associated with communication via different types of packet-switched networks (e.g., VoLTE as compared to VoWiFi), with different quality of service (QoS) settings or "requirements", or with different factors. Adjusting the lower bound 132 and the upper bound 134 adjusts the range from which the target delay value associated with a talk spurt is selected, which enables selection of target delay values that were not permissible prior to the adjustment. For example, if the lower bound 132 is decreased, a smaller target delay value may be selected than was permissible prior to the decrease. However, increasing the lower bound 132 may cause the target delay value to be increased in order to remain within the target delay range. As another example, if the upper bound 134 is increased, a larger target delay value may be selected than was permissible prior to the increase. However, decreasing the upper bound 134 may cause the target delay value to be decreased in order to remain within the target delay range.

The de-jitter buffer control circuitry 130 may also drop one or more audio packets from the de-jitter buffer 150 based on the relative play out delay metric 149 satisfying the second delay threshold. The de-jitter buffer control circuitry 130 may adjust one or more parameters associated with audio packet drop rates or perform other actions to cause the one or more audio packets to be dropped from the de-jitter buffer 150. Dropping an audio packet from the de-jitter buffer 150 may include erasing or otherwise removing the audio packet from the de-jitter buffer without playing out the audio packet.

To illustrate, the de-jitter buffer control circuitry 130 may determine the relative play out delay metric 149 based on a result of a comparison of a difference between audio play out time values and a difference between audio generation time values at the source (converted to time units based a timestamp clock frequency if the generation time values are indicated by timestamps). The timestamp clock frequency may correspond to a clock signal frequency that is used to generate timestamp values. For example, a timestamp may be generated upon receipt of the audio packets 152-158 at the second device 120. Additional timestamps may be generated at play out of the audio packets 152-158. The receipt timestamps and the play out timestamps may be stored at the memory 140 as the play out time information 148. Additionally, the audio packets 152-158 include corresponding timestamps 160-166 that indicate a time of generation (or transmission) of the audio packets 152-158 at the first device 102.

The audio play out time value may be based on a comparison of a first audio play out time of an oldest active audio packet and a second audio play out time of a most recently played out audio packet. For example, if the first audio packet 152 is the most recently played out audio packet (and has been removed or dequeued from the de-jitter buffer 150), and an initial audio packet (not shown) has been played out, the audio play out time value may be based on the difference between the first audio play out time and the second audio play out time. The timestamp value may be based on a comparison of a first timestamp associated with the oldest active audio packet and a second timestamp associated with the most recently played out audio packet. For example, if the first audio packet 152 is the most recently played out audio packet, and the initial audio packet is the oldest played out audio packet, the timestamp value may be based on the difference between a timestamp associated with the initial audio packet and the first timestamp 160.

In a particular implementation, the relative play out delay metric 149 ("D") may be determined using the following equation:

$$D = (t_{cp} - t_{pp}) - \frac{(T_{cp} - T_{pp})}{\text{timestamp clock frequency}} \qquad \text{(Equation 2)}$$

where $t_{cp}$ is the play out time associated with the oldest active audio packet, $t_{pp}$ is the play out time associated with the most recently played out audio packet, $T_{cp}$ is the RTP timestamp associated with the oldest active audio packet, $T_{pp}$ is the RTP timestamp associated with the most recently played out audio packet, and "timestamp clock frequency" is the RTP timestamp clock frequency.

If at least one active audio packet (e.g., an audio packet that has not been played out) remains in the de-jitter buffer 150 and the relative play out delay metric 149 is greater than the second delay threshold (THRSHLD), then the oldest active audio packet in the de-jitter buffer is dropped. For example, if the second audio packet 154 is the oldest active audio packet (e.g., the second audio packet 154 has not been played out and the second timestamp 162 is older than the timestamps 164 and 166), then the de-jitter buffer control circuitry 130 drops the second audio packet 154 from the de-jitter buffer 150. Processing of the audio packets 156 and 158 continues in a similar manner.

In a particular implementation, the second delay threshold (THRSHLD) is fixed. For example, the second delay threshold may be set based on an anticipated network type to be used by the second device 120, such as a VoLTE network or a VoWiFi network, or based on a target QoS metric, or another factor. As a non-limiting example, the second delay threshold associated with VoWiFi may exceed the second delay threshold associated with VoLTE. Alternatively, the second delay threshold may be dynamically adjustable. For example, the second delay threshold may be updated based on a comparison of the first delay threshold, a "maximum allowable mouth-to-ear delay" (e.g., a maximum mouth-to-ear delay specified by a wireless communications standard or associated with a particular type of wireless communication or network), and an estimated mouth-to-ear delay associated with the second device 120. To further illustrate, the second threshold may be adjusted based on a difference between the maximum allowable mouth-to-ear delay (e.g., the first delay threshold) and the estimated mouth-to-ear delay such that the difference is not less than zero. As a particular example, the second delay threshold may be 80 ms and the maximum allowable mouth-to-ear delay (e.g., the first delay threshold) may be 400 ms (e.g., a maximum allowable mouth-to-ear delay specified by an LTE standard). The maximum allowable mouth-to-ear delay (e.g., the first delay threshold) may be different for different network types. For example, a maximum allowable mouth-to-ear delay (e.g., the first delay threshold) associated with VoLTE may be 400 ms (e.g., because LTE specifies QoS requirements), and a maximum allowable mouth-to-ear delay (e.g., the first delay threshold) associated with VoWiFi may be 500 ms (e.g., due to lessened quality expectations associated with VoWiFi).

In a particular implementation, de-jitter buffer control circuitry 130 (or the processor 126) determines a directly estimated mouth-to-ear delay associated with the second device 120 based on an audio transmit path delay, a RTP-to-RTP delay, a de-jitter buffer delay, and an audio receive path delay. The directly estimated mouth-to-ear delay may be calculated if the second device 120 and the first device 102 use a common timestamp clock. For example, the first device 102 and the second device 120 may use a clock based on a global positioning satellite (GPS) signal, a first clock signal associated with an LTE network (e.g., "SystemTimeInfoCDMA2000" in system information block 8 (SIB8)), a second clock signal associated with an LTE network (e.g., "TimeInfo" in SIB16), or another common clock signal. A time based on the common clock is represented by a received network time protocol (NTP) timestamp in a RTP control protocol (RTCP) packet. The various delays (e.g., the audio transmit path delay, the RTP-to-RTP delay, the de-jitter buffer delay, and the audio receive path delay) may be determined based on timestamp values determined at the first device 102 (and indicated by or appended to the RTP packets that include the plurality of audio packets 116) along with the NTP timestamp in the received RTCP packet and time values (such as dequeue times, decode times, play out times, etc.) determined at the second device 120.

Alternatively, if the first device 102 and the second device 120 do not use a common timestamp clock, the de-jitter buffer control circuitry 130 may determine an indirectly estimated mouth-to-ear delay. For example, the audio transmit path delay may be estimated based on local audio transmit path delay (at the second device 120) and the RTP-to-RTP delay may be estimated as half of an RTP round trip time derived from timing information contained in the received RTCP packets. The other values (e.g., de-jitter buffer delay and audio receive path delay) are calculated by the second device 120 since de-jitter buffer delay and the audio receive path delay occur at the receiving device (e.g., the second device 120).

In a particular implementation, the de-jitter buffer control circuitry 130 may drop audio packets that are associated with a particular talk spurt and not audio packets associated with other talk spurts. Alternatively, the de-jitter buffer control circuitry 130 may drop audio packets associated with any talk spurt based on the above-described comparisons.

In another particular implementation, the de-jitter buffer control circuitry 130 may drop audio packets from the de-jitter buffer 150 further in response to a number of active audio packets stored at the de-jitter buffer 150 satisfying a threshold that is greater than 1. The threshold may be configurable or preprogrammed.

In another particular implementation, the de-jitter buffer control circuitry 130 may stop dropping audio packets from the de-jitter buffer 150 in response to a number of consecutive dropped packets satisfying a threshold that is greater than 1. The threshold may be configurable or preprogrammed. In some implementations, stopping audio packet drops may be further based on a second threshold that is associated with one or more settings of the second device 120. For example, the second threshold may relate to the arrival jitter which is associated with a frame bundling mode or a CDRX mode.

Thus, the system 100 enables a de-jitter buffer to adjust operating parameters to improve output speech quality, reduce a mouth-to-ear delay, or achieve a better balance between output speech quality and mouth-to-ear delay. For example, in low jitter conditions, the lower bound 132 may be decreased to enable selection of a smaller target delay value (e.g., the delay between receipt of a first audio packet of a talk spurt at the de-jitter buffer 150 and play out of the audio packet from the de-jitter buffer 150) without significantly increasing the underflow rate (which may decrease output speech quality). As another example, in high jitter conditions, the lower bound 132 may be increased to enable selection of a larger target delay value, which may allow more audio packets to be received and played out on time at the de-jitter buffer 150 to reduce the underflow rate. As yet another example, in high underflow conditions, the upper bound 134 may be increased to enable selection of a larger target delay value, which may increase the amount of time between receipt of the first audio packet of the talk spurt at the de-jitter buffer 150 and play out of the first audio packet from the de-jitter buffer 150 to allow more audio packets to be received and played out on time. Increasing the target delay of the de-jitter buffer 150 for a talk spurt may reduce the underflow rate while maintaining a perceived delay between talk spurts at a level that is substantially imperceptible to a user. In some implementations, the lower bound 132 may be adjusted, the upper bound 134 may be adjusted, and one or more audio packets may be dropped during a single conversation.

Additionally, the system 100 enables audio packets to be dropped from the de-jitter buffer 150 based on the relative play out delay metric 149 to maintain good balance between speech quality and mouth-to-ear delay. By dropping one or more audio packets, a mouth-to-ear delay associated with play out of remaining audio packets may be reduced without significant loss of output quality. Dropping audio packets may improve performance of the second device 120 during long handoff procedures, network faults, or severe network congestion.

Figure 2A:
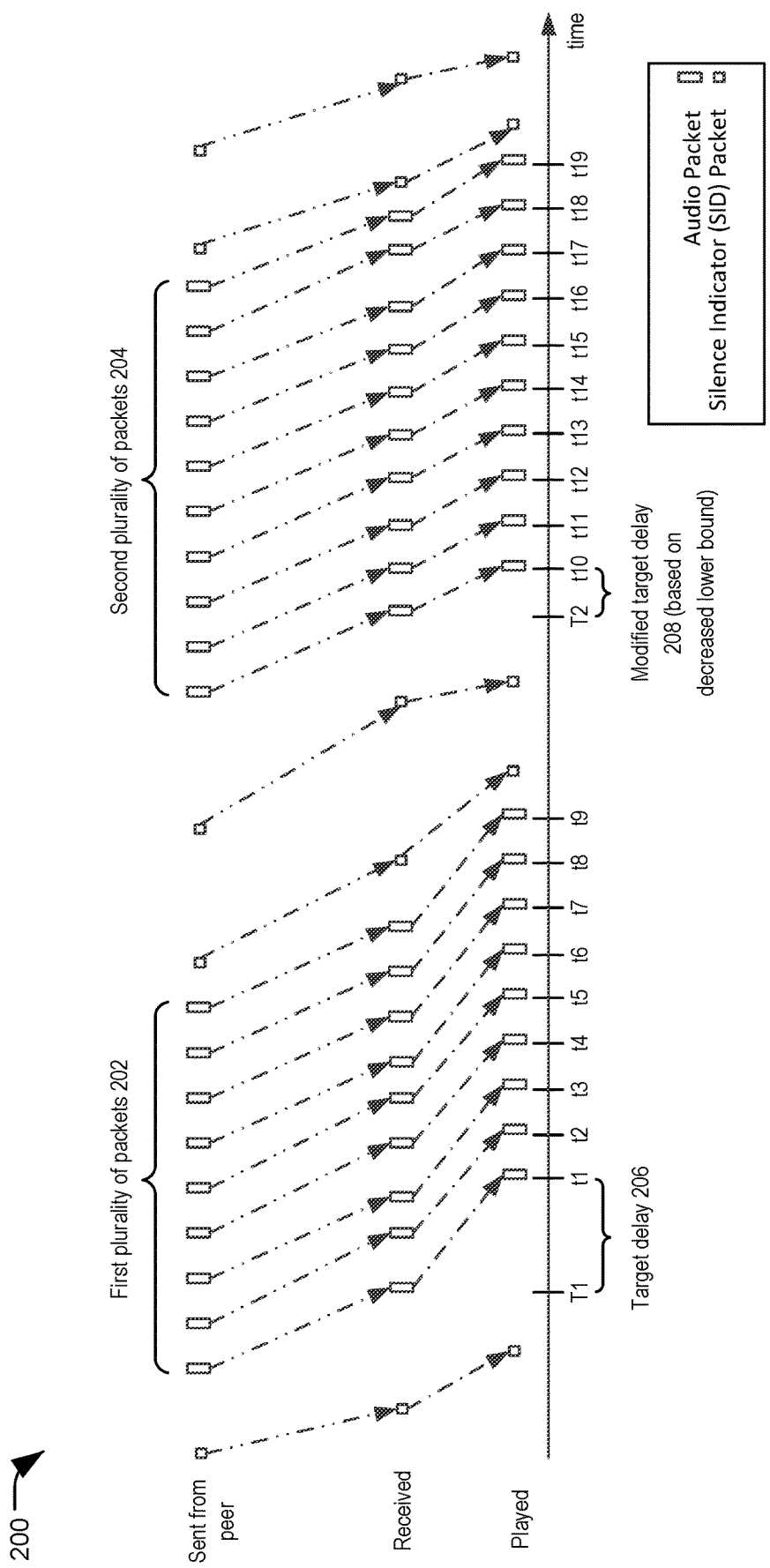
FIG. 2A illustrates a first example of adjusting an operating parameter of a de-jitter buffer.

Referring to FIG. 2A, a first example of adjusting an operating parameter of a de-jitter buffer is shown. In a particular implementation, the operating parameter may be adjusted by the de-jitter buffer control circuitry 130 of FIG. 1A.

FIG. 2A illustrates a timing diagram 200 of audio packet transmission and reception by devices of a network, such as a packet-switched network. In this example, one or more operating parameters of a de-jitter buffer are adjusted. A first device transmits a first plurality of audio packets 202 and a second plurality of audio packets 204 to a second device. In a particular implementation, the first device includes or corresponds to the first device 102 of FIG. 1A, and the second device includes or corresponds to the second device 120 of FIG. 1A. The first plurality of audio packets 202 may correspond to a first talk spurt and the second plurality of audio packets 204 may correspond to a second talk spurt. As illustrated in FIG. 2A, talk spurts may be separated by one or more SID packets. The timing of the SID packets is illustrative and is not to be construed as limiting. Due to conditions within the packet-switched network or due to handoff procedures between networks having different types, (e.g., from a VoWiFi network to a VoLTE network, as a non-limiting example), the first plurality of audio packets 202 and the second plurality of audio packets 204 may be received with minimal audio packet loss, small delay between audio packets, and small jitter (e.g., small delay variation between receipt of audio packets). Due to the small jitter, the underflow rate is small (or zero).

Play out of audio packets associated with the first plurality of audio packets 202 may be associated with a target delay 206 (e.g., an initial target delay) that is based on a first value of a lower bound of a target delay range associated with a de-jitter buffer (e.g., the de-jitter buffer 150 of FIG. 1A). For example, the target delay 206 may be a value that is within a range from the lower bound to an upper bound. Thus, the target delay 206 may not be less than the lower bound or higher than the upper bound. Lowering the target delay 206 may decrease a mouth-to-ear delay while potentially decreasing audio output quality (e.g., potentially increasing underflow rate), and increasing the target delay 206 may increase the audio output quality (and reduce the underflow rate) while potentially increasing the mouth-to-ear delay. In FIG. 2A, the target delay 206 is 40 ms, which corresponds to a lower bound of 40 ms. Thus, a first audio packet is played out at time t1, which is 40 ms after time T1 (e.g., a receipt time associated with the first audio packet).

Because an estimated jitter associated with the first plurality of audio packets 202 is small (e.g., fails to satisfy a jitter threshold condition, as described with reference to FIG. 1A) and the estimated underflow rate is small (e.g., fails to satisfy an underflow threshold condition, as described with reference to FIG. 1A), the lower bound may be reduced prior to play out of the second plurality of audio packets 204. By reducing (e.g., decreasing) the lower bound, a smaller target delay value may be selected as a modified target delay 208. In FIG. 2A, the lower bound is decreased from 40 ms to 20 ms (e.g., a change of 20 ms) such that the modified target delay 208 is 20 ms when the modified target delay 208 is set to the lower bound. Thus, a tenth audio packet is played out at time t10, which is 20 ms after time T2. By reducing the target delay 216 by 20 ms (e.g., by decreasing the lower bound by 20 ms when the target delay 216 is set to the lower bound), a mouth-to-ear delay associated with the second plurality of audio packets 204 is reduced by 20 ms as compared to a mouth-to-ear delay associated with the first plurality of audio packets 202. In other implementations, the target delay 206, the lower bound, and the modified target delay 208 may have other values.

Figure 2B:
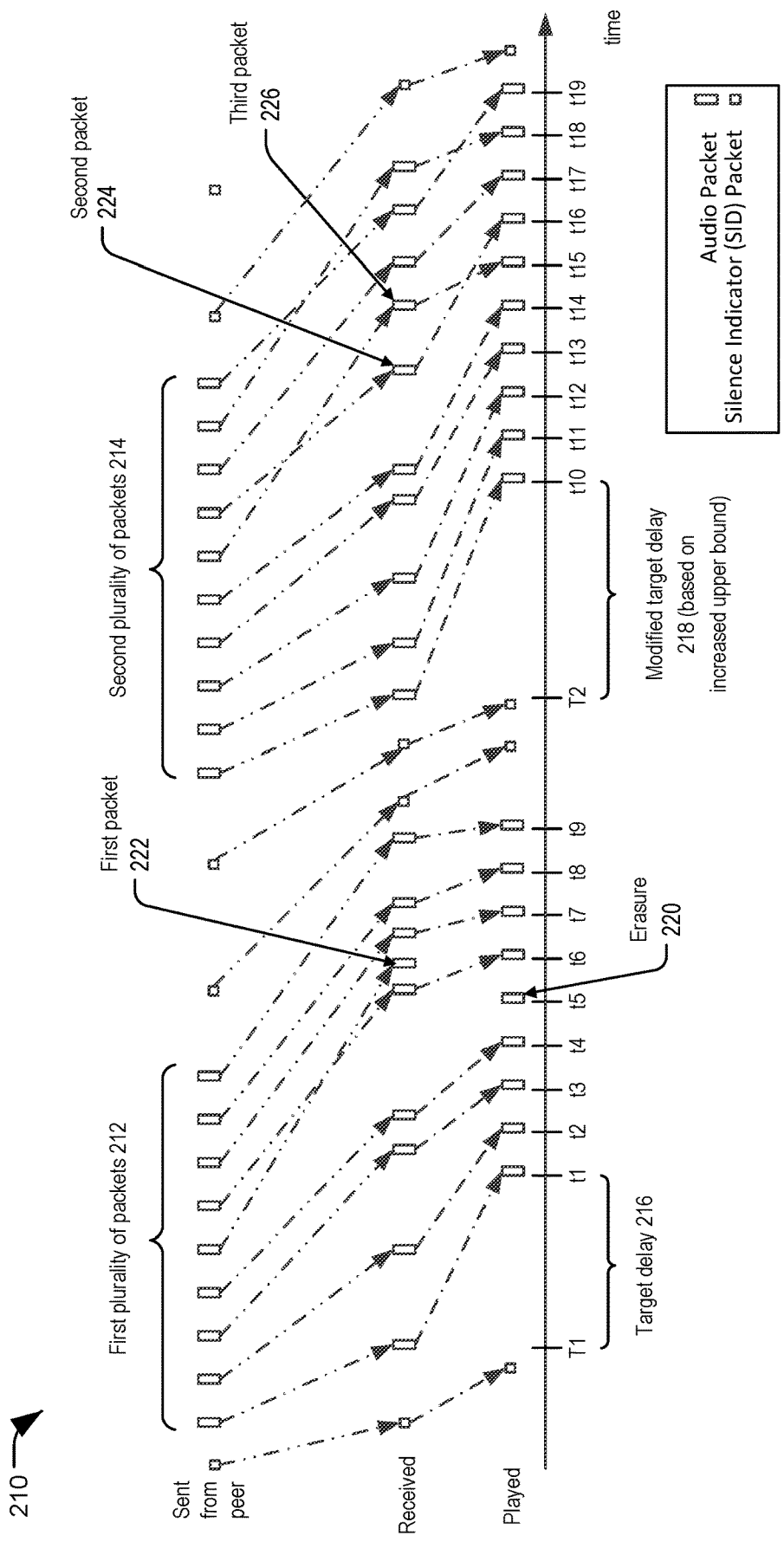
FIG. 2B illustrates a second example of adjusting an operating parameter of a de-jitter buffer.

Referring to FIG. 2B, a second example of adjusting an operating parameter of a de-jitter buffer is shown. In a particular implementation, the operating parameter may be adjusted by the de-jitter buffer control circuitry 130 of FIG. 1A.

FIG. 2B illustrates a timing diagram 210 of audio packet transmission and reception by devices of a network, such as a packet-switched network. In this example, one or more operating parameters of a de-jitter buffer (e.g., the de-jitter buffer 150 of FIG. 1A) are adjusted. A first device transmits a first plurality of audio packets 212 and a second plurality of audio packets 214 to a second device. In a particular implementation, the first device includes or corresponds to the first device 102 of FIG. 1A, and the second device includes or corresponds to the second device 120 of FIG. 1A. The first plurality of audio packets 212 may correspond to a first talk spurt and the second plurality of audio packets 214 may correspond to a second talk spurt. As illustrated in FIG. 2B, talk spurts may be separated by one or more SID packets. The timing of the SID packets is illustrative and is not to be construed as limiting. Due to conditions within the packet-switched network or due to handoff procedures between networks having different types (e.g., from a VoLTE network to a VoWiFi network, as a non-limiting example), the first plurality of audio packets 212 and the second plurality of audio packets 214 may be received with large jitter (e.g., large delay variation between receipt of audio packets) and possible audio packet loss.

An upper bound of a target delay range associated with a target delay 216 may be set to a particular value prior to play out of the first plurality of audio packets 212. In FIG. 2B, the upper bound is set to 80 ms, and thus the target delay 216 can be selected from a range of values that does not exceed 80 ms. In an example when the target delay 216 is set as 80 ms and there is substantial jitter, a first packet 222 may be received after a time t5 designated for play out of the first packet 222. Thus, an erasure 220 (or other packet error condition) may be generated at time t5. Because the first packet 222 is received after time t5, the first packet 222 contributes to an estimated underflow rate associated with the first plurality of audio packets 212. As described with reference to FIG. 1A, if the estimated underflow rate satisfies an underflow threshold and an estimated mouth-to-ear delay fails to satisfy a maximum allowable mouth-to-ear delay, the upper bound may be increased. In FIG. 2B, the estimated mouth-to-ear delay is 280 ms, and the maximum allowable mouth-to-ear delay is 300 ms.

Because the estimated mouth-to-ear delay is less than the maximum allowable mouth-to-ear delay, the upper bound may be increased, thereby resulting in a modified target delay 218, as described with reference to FIG. 1A. In FIG. 2B, the upper bound is increased by 20 ms to a value of 100 ms. Increasing the upper bound when the modified target delay 218 is set to the upper bound increases the amount of time between play out of a first audio packet from the de-jitter buffer. For example, the amount of time between time t10 and time T2 (e.g., the modified target delay 218) is greater than the amount of time between time t1 and time T1 (e.g., the target delay 216). By increasing the upper bound by 20 ms when the modified target delay 218 is set to the upper bound, play out of the second plurality of audio packets 214 is delay by an additional 20 ms. Due to the additional 20 ms delay, a second audio packet 224 and a third audio packet 226 that are received out of order (or an audio packet that would have been received after a corresponding play out time based on the target delay 216) may be re-ordered and played out without an underflow condition occurring. For example, the third audio packet 226 may be received after the second audio packet 224 even though the timestamp associated with the third audio packet 226 is earlier than the timestamp associated with the second audio packet 224, and the audio packets 224 and 226 may be played out in the correct order and/or at the corresponding play out times. In other implementations, the target delay 216, the modified target delay 218, the upper bound, the estimated mouth-to-ear delay, and the maximum allowable mouth-to-ear delay may have other values. Increasing the upper bound in high jitter situations may provide a tradeoff between audio output quality (which is impacted by the underflow rate) and estimated mouth-to-ear delay.

Figure 2C:
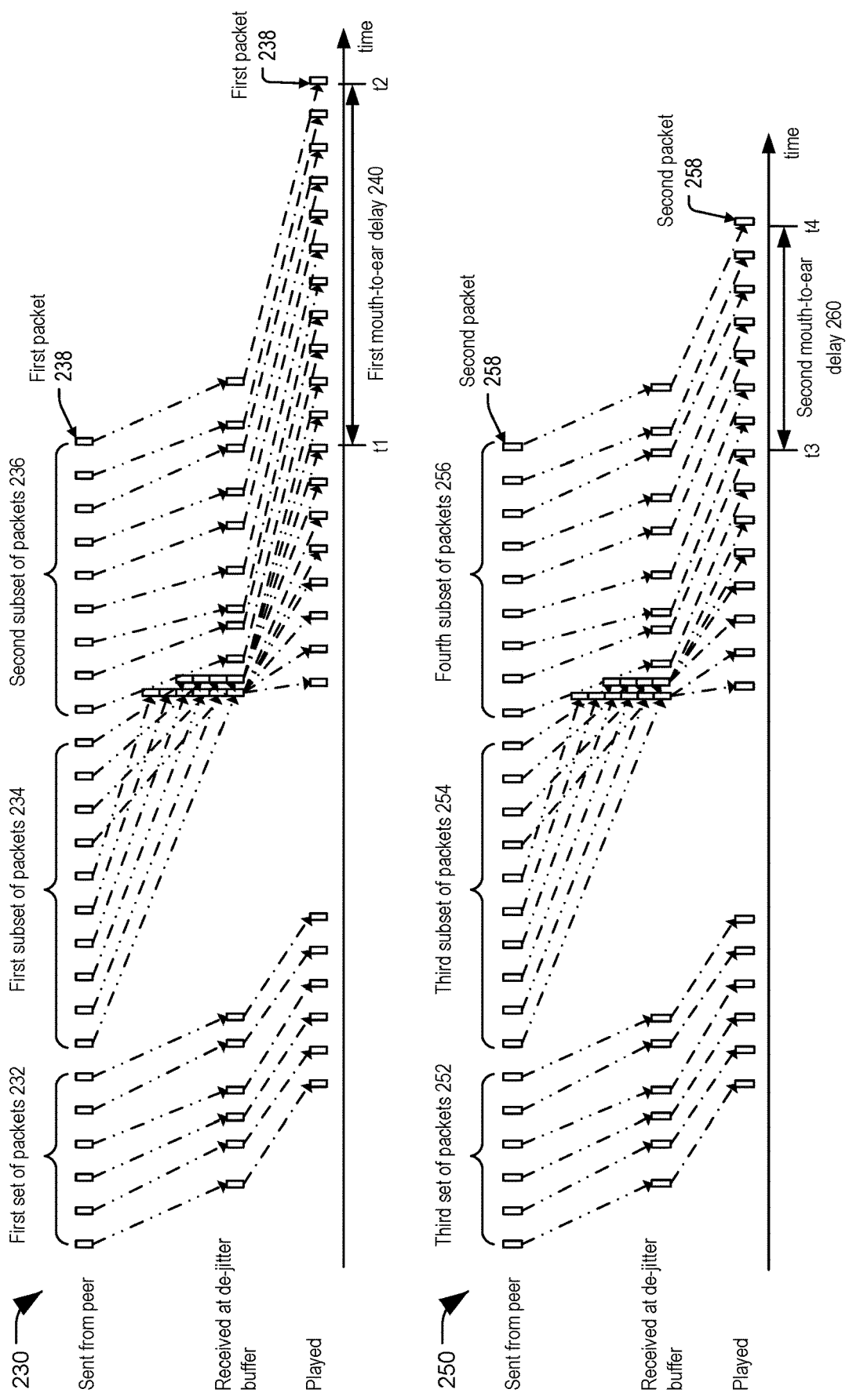
FIG. 2C illustrates a third example of adjusting an operating parameter of a de-jitter buffer.

Referring to FIG. 2C, a third example of adjusting an operating parameter of a de-jitter buffer is shown. In a particular implementation, the operating parameter may be adjusted by the de-jitter buffer control circuitry 130 of FIG. 1A.

FIG. 2C illustrates a first timing diagram 230 of audio packet transmission and reception by devices of a network, such as a packet-switched network. In this example, the devices do not operate in accordance with the present disclosure (e.g., one or more operating parameters of a de-jitter buffer are not adjusted). A first device transmits a first set of audio packets 232, a first subset of audio packets 234, and a second subset of audio packets 236. Due to conditions within the packet-switched network or due to handoff procedures, the first set of audio packets 232 may be received with minimal audio packet loss and small jitter (e.g., small delay variation between receipt of audio packets). However, the first subset of audio packets 234 may be received as a "chunk" (e.g., in a short amount of time), and the second subset of audio packets 236 may be received shortly after receipt of the first subset of audio packets 234. Because the operating parameters of the de-jitter buffer are not adjusted, each received audio packet is played out based on set thresholds and target delay values selected from ranges within set bounds (e.g., fixed lower bounds and fixed upper bounds), resulting in a large first mouth-to-ear delay 240 between transmission of a first packet 238 and play out of the first packet 238.

FIG. 2C also illustrates a second timing diagram 250 of audio packet transmission and reception by devices of a network, such as a packet-switched network, in accordance with the present disclosure. In a particular implementation, the devices may include the first device 102 and the second device 120, and the network may include the network 112 of FIG. 1A. In this example, operating parameters (e.g., audio packet drop parameters) are adjusted. The first device transmits a third set of audio packets 252, a third subset of audio packets 254, and a fourth subset of audio packets 256. Due to conditions within the packet-switched network or due to handoff procedures, the third set of audio packets 252 may be received with minimal audio packet loss and small jitter. However, the third subset of audio packets 254 may be received as a chunk, and the fourth subset of audio packets 256 may be received shortly after receipt of the third subset of audio packets 254. Based on the relative play out delay between the third set of audio packets 252 and the third subset of audio packets 254 satisfying a threshold, one or more of the third subset of audio packets 254 or the fourth subset of audio packets 256 may be dropped, resulting in a second mouth-to-ear delay 260 between transmission of a second packet 258 and play out of the second packet 258 that is less than the first mouth-to-ear delay 240. Thus, dropping one or more audio packets may reduce mouth-to-ear delay at a receiving device. In some implementations, the relative play out delay threshold (e.g., the second delay threshold) may be adjusted based on a directly estimated or an indirectly estimated mouth-to-ear delay, a maximum allowable mouth-to-ear delay, and other measured values, as described with reference to FIG. 1A. For example, the threshold may be adjusted from a first threshold to a second threshold based on a change in the estimated mouth-to-ear delay.

Figure 3:
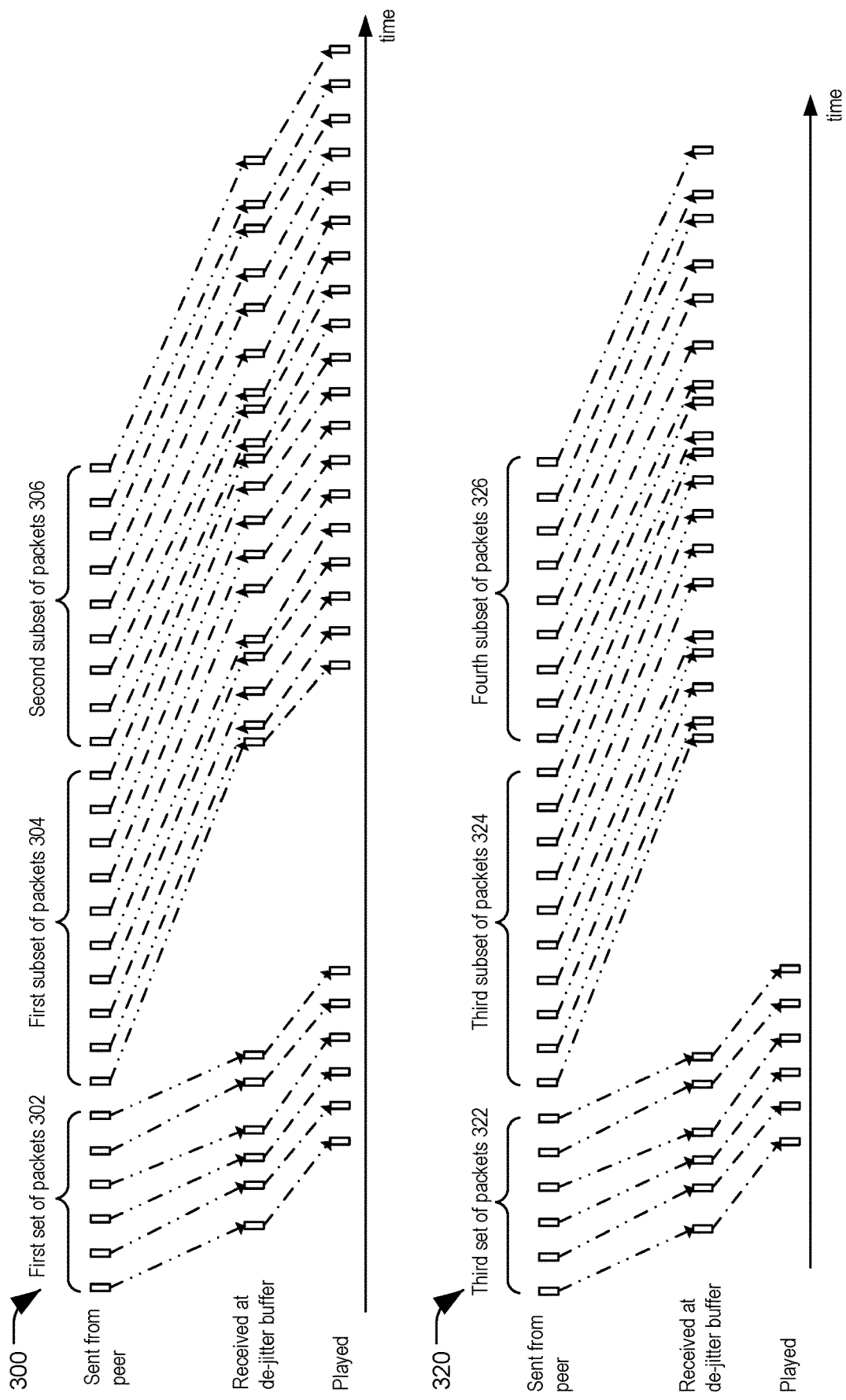
FIG. 3 illustrates a fourth example of adjusting an operating parameter of a de-jitter buffer.

Referring to FIG. 3, a second example of adjusting an operating parameter of a de-jitter buffer is shown. In a particular implementation, the operating parameter may be adjusted by the de-jitter buffer control circuitry 130 of FIG. 1A.

FIG. 3 illustrates a first timing diagram 300 of audio packet transmission and reception by devices of a network, such as a packet-switched network. In this example, one or more operating parameters of a de-jitter buffer are not adjusted. A first device transmits a first set of audio packets 302, a first subset of audio packets 304, and a second subset of audio packets 306. Due to conditions within the packet-switched network or due to handoff procedures, the first set of audio packets 302 may be received with minimal audio packet loss and small jitter. However, the first subset of audio packets 304 and the second subset of audio packets 306 may be received after a substantial delay. Because the first subset of audio packets 304 and the second set of audio packets 306 are played out of the de-jitter buffer, a mouth-to-ear delay associated with the first subset of audio packets 304 and the second subset of audio packets 306 may be large.

FIG. 3 also illustrates a second timing diagram 320 of audio packet transmission and reception by devices of a network, such as a packet-switched network. In this example, audio packets are dropped regardless of the number of previously dropped audio packets. As illustrated in FIG. 3, similar timing conditions occur for a third set of packets 322, a third subset of audio packets 324, and a fourth subset of audio packets 326 as compared to the first set of audio packets 302, the first subset of audio packets 304, and the second subset of audio packets 306. However, because audio packets are dropped if a relative play out delay in receiving the audio packets satisfies a threshold, all of the third subset of audio packets 324 and the fourth subset of audio packets 326 are dropped. Dropping this many audio packets may result in a noticeable gap in output speech, which may degrade user experience.

Figure 4:
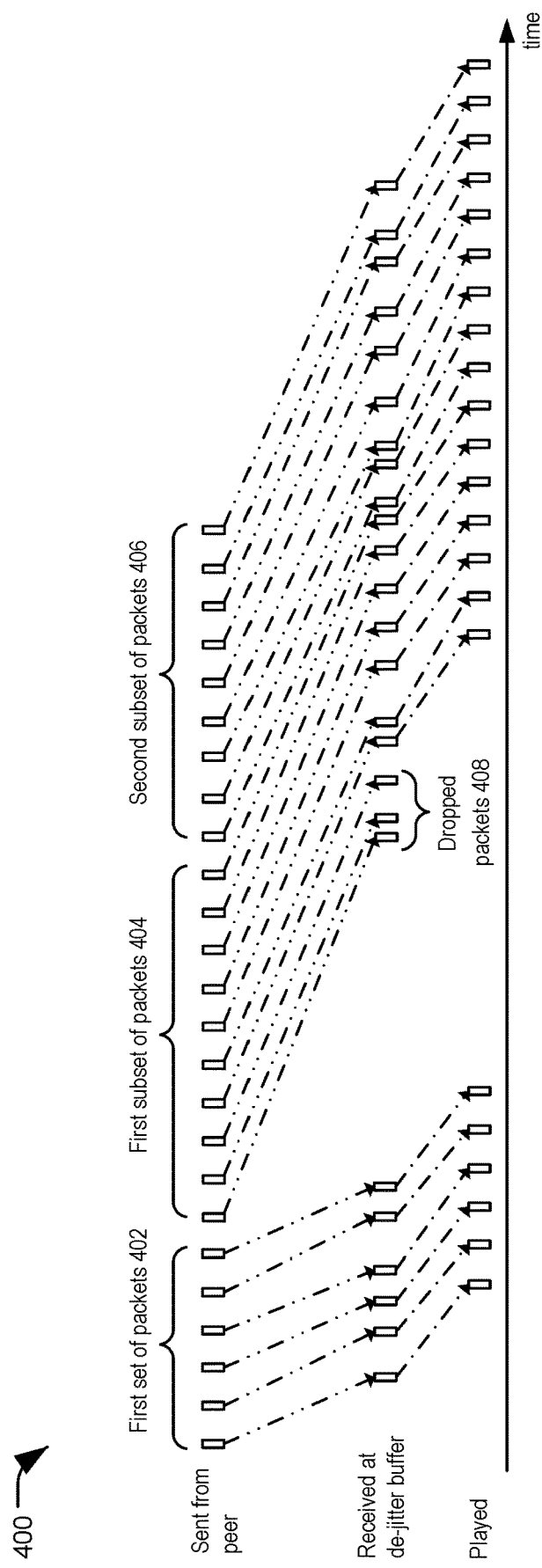
FIG. 4 illustrates a fifth example of adjusting an operating parameter of a de-jitter buffer.

Referring to FIG. 4, a third example of adjusting an operating parameter of a de-jitter buffer is shown. In a particular implementation, the operating parameter may be adjusted by the de-jitter buffer control circuitry 130 of FIG. 1A.

FIG. 4 illustrates a timing diagram 400 of audio packet transmission and reception by devices of a network, such as a packet-switched network. In this example, dropping of audio packets is stopped after a particular number of consecutive audio packets are dropped. A first set of audio packets 402, a first subset of audio packets 404, and a second subset of audio packets 406 are transmitted and received as described with reference to FIG. 3. However, after dropping a particular number of dropped audio packets 408 (e.g., one or more audio packets of the first subset of audio packets 404 or the second subset of audio packets 406), audio packet dropping is stopped, and subsequent audio packets in the de-jitter buffer are played out. In some implementations, a particular number of audio packets may be played out before additional audio packets may be dropped. Playing out fewer than all of the audio packets in the de-jitter buffer may balance mouth-to-ear delay with output speech quality, such that output speech may be delayed without suffering extended gaps in the output speech (as compared to FIG. 3).

Figure 5:
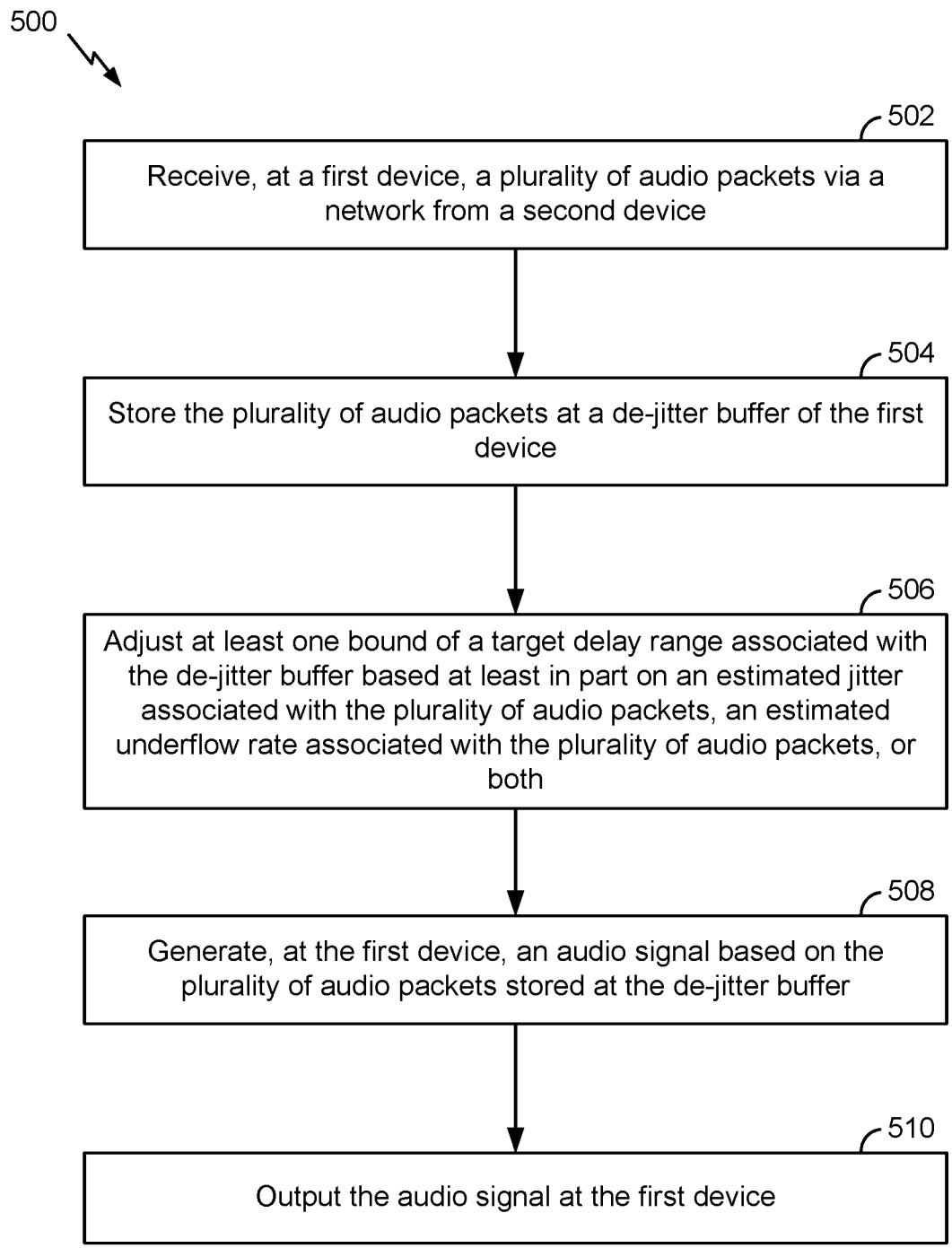
FIG. 5 is a flow chart that illustrates an illustrative method of adjusting an operating parameter of a de-jitter buffer.

Referring to FIG. 5, a flow chart of an illustrative method of adjusting an operating parameter of a de-jitter buffer is shown and generally designated 500. In a particular implementation, the method 500 may be performed by the system 100 (or the de-jitter buffer control circuitry 130) of FIG. 1A.

The method 500 includes receiving, at a first device, a plurality of audio packets via a network from a second device, at 502. For example, the second device 120 may receive the plurality of audio packets 116 from the first device 102 via the network 112, as described with reference to FIG. 1A.

The method 500 includes storing the plurality of audio packets at a de-jitter buffer of a first device, at 504. For example, the de-jitter buffer control circuitry 130 of the second device 120 may store the plurality of audio packets 116 at the de-jitter buffer 150, as described with reference to FIG. 1A.

The method 500 includes adjusting at least one bound of a target delay range associated with the de-jitter buffer based at least in part on an estimated jitter associated with the plurality of audio packets, an estimated underflow rate associated with the plurality of audio packets, or both, at 506. The at least one bound includes a lower bound associated with the target delay range, an upper bound associated with the target delay range, or both, and the target delay range is between the lower bound and the upper bound. For example, the de-jitter buffer control circuitry 130 may adjust the lower bound 132, the upper bound 134, or both, based on the estimated jitter 142, the estimated underflow rate 144, or both, as described with reference to FIG. 1A. In other implementations, other operating parameters are adjusted.

The method 500 includes generating, at the first device, an audio signal based on the plurality of audio packets, at 508. For example, the processor 126 may generate an audio signal based on audio packets played out from the de-jitter buffer 150, as described with reference to FIG. 1A.

The method 500 also includes outputting the audio signal at the first device, at 410. For example, the speaker 128 may output the audio signal, as described with reference to FIG. 1A. In some implementations, receiving the plurality of audio packets, storing the plurality of audio packets, adjusting the at least one bound of the target delay range, generating the audio signal, and outputting the audio signal are performed at a base station or a mobile device, such as the first device 102 or the second device 120.

In a particular implementation, the plurality of audio packets is received in a first order and a second plurality of audio packets that correspond to the plurality of audio packets is received in a second order. For example, the first device 102 may transmit the plurality of audio packets 114 in a first order different from a second order of the plurality of audio packets 116 that the second device 120 receives via the network 112, as described with reference to FIG. 1A.

In a particular implementation, the at least one bound includes a lower bound associated with the target delay range, and adjusting the at least one bound includes decreasing the lower bound in response to the estimated jitter failing to satisfy a first jitter threshold, the estimated underflow rate failing to satisfy a first underflow threshold, or both. For example, the estimated jitter may include or correspond to the estimated jitter 142 of FIG. 1A, the estimated underflow rate may include or correspond to the estimated underflow rate 144 of FIG. 1A, and the first jitter threshold and the first underflow threshold may be included in the thresholds 146.

In some implementations, adjusting the at least one bound includes increasing the lower bound in response to the estimated jitter satisfying a second jitter threshold and the estimated underflow rate satisfying a second underflow threshold. In a particular implementation, the at least one bound also includes an upper bound associated with the target delay range, and adjusting the at least one bound further includes increasing the upper bound in response to the first estimated underflow rate satisfying the third underflow threshold. Adjusting the at least one bound may further include capping (e.g., setting a maximum value of) the upper bound at a current value in response to a determination that an estimated mouth-to-ear delay (e.g., a directly estimated mouth-to-ear delay or an indirectly estimated mouth-to-ear delay) associated with one or more audio packets stored at the de-jitter buffer is equal to a maximum allowable mouth-to-ear delay. In another particular implementation, the upper bound may be decreased, as described with reference to FIG. 1A.

In another particular implementation, the method 500 includes determining an instantaneous underflow rate associated with the plurality of audio packets and determining the estimated underflow rate based on the instantaneous underflow rate. For example, the instantaneous underflow rate may be determined based on a number of underflow conditions associated with the plurality of audio packets 116, and the estimated underflow rate 144 may be based on the instantaneous underflow rate.

Thus, the method 500 of FIG. 5 enables a de-jitter buffer to adjust bounds of a target delay range (or other operating parameters) to improve output speech quality, reduce a mouth-to-ear delay, or achieve a better balance between output speech quality and mouth-to-ear delay. For example, in low jitter conditions, the lower bound may be decreased to reduce the delay to play out a first audio packet of a group of audio packets (and therefore the rest of the audio packets of the group) from the de-jitter buffer without significantly increasing the underflow rate. As another example, in high jitter conditions, the lower bound may be increased to allow more audio packets to be received and played out on time to reduce the underflow rate. As yet another example, in high underflow conditions, the upper bound may be increased to increase the amount of time to play out of a first audio packet of a group of audio packets and therefore the rest of audio packets of the group from the de-jitter buffer. In other conditions, the upper bound may be decreased to reduce the mouth-to-ear delay. Increasing the target delay may reduce the estimated underflow rate while maintaining the particular delay at acceptable levels (e.g., not perceptible to a user).

Figure 6:
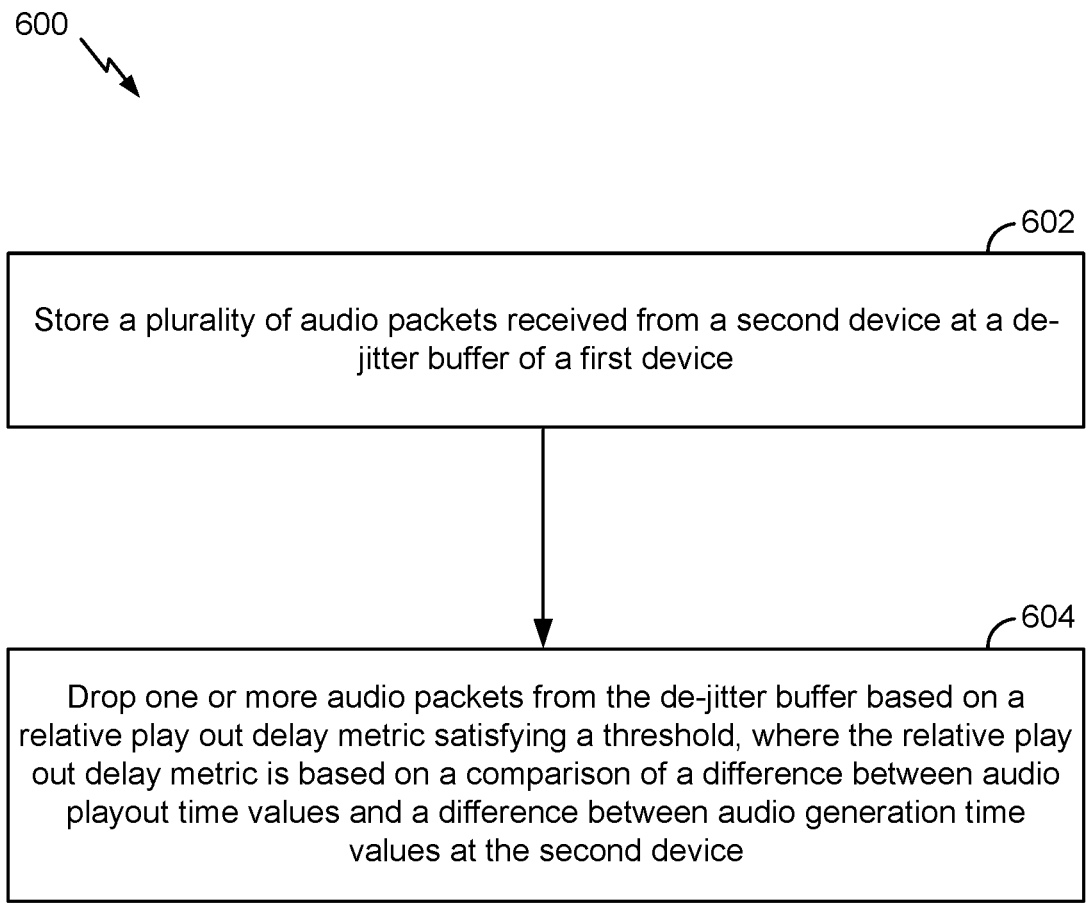
FIG. 6 is a flow chart that illustrates an illustrative method of dropping one or more audio packets from a de-jitter buffer.

Referring to FIG. 6, a flow chart of an illustrative method of dropping one or more audio packets from a de-jitter buffer is shown and generally designated 600. In a particular implementation, the method 600 may be performed by the system 100 (or the de-jitter buffer control circuitry 130) of FIG. 1A.

The method 600 includes storing a plurality of audio packets received from a second device at a de-jitter buffer of a first device, at 602. For example, the de-jitter buffer control circuitry 130 of the second device 120 may store the plurality of audio packets 116 at the de-jitter buffer 150 response to receiving the plurality of audio packets 116 from the first device 102 via the network, as described with reference to FIG. 1A.

The method 600 includes dropping one or more audio packets from the de-jitter buffer based on a relative play out delay metric satisfying a threshold. The relative play out delay metric may be based on a result of a comparison of a difference between audio play out time values and a difference between audio generation time values at the second device, at 604. The audio generation time values may be converted to time units based on a timestamp clock frequency if the generation time values are indicated by timestamps. For example, the de-jitter buffer control circuitry 130 may remove one or more audio packets of the plurality of audio packets 116 from the de-jitter buffer 150 based on the relative play out delay metric 149, as described with reference to FIG. 1A. To illustrate, the de-jitter buffer control circuitry 130 may remove (without playing out) the first audio packet 152 based on the relative play out delay metric 149. The relative play out delay metric 149 may be determined based on a result of a comparison of the difference between the play out time information 148 and the play out time of the previously played out audio packet and the difference between the timestamp 160 and the timestamp of the previously played out audio packet (converted to time units based on the timestamp clock frequency), as described with reference to FIG. 1A. In some implementations, the threshold that is compared to the relative play out delay metric may be dynamically adjusted based on a comparison of an estimated mouth-to-ear delay and a maximum allowable mouth-to-ear delay. For example, the relative play out delay metric may be dynamically adjusted based on a difference between the maximum allowable mouth-to-ear delay and the estimated mouth-to-ear delay (e.g., a directly estimated mouth-to-ear delay or an indirectly estimated mouth-to-ear delay). In some implementations, storing the plurality of audio packets and dropping the one or more audio packets are performed at a base station or a mobile device, such as the first device 102 and the second device 120 of FIG. 1A.

In a particular implementation, the method 600 includes initiating play out of one or more remaining audio packets stored at the de-jitter buffer after the one or more audio packets are dropped, where dropping the one or more audio packets includes removing the one or more audio packets from the de-jitter buffer without generating a play out of the one or more audio packets. For example, the processor 126 may initiate play out of the one or more remaining audio packets stored at the de-jitter buffer 150 via the speaker 128, as described with reference to FIG. 1A.

In a particular implementation, the method 600 includes adjusting the threshold based on user input. For example, the de-jitter buffer control circuitry 130 may adjust one or more thresholds of the thresholds 146 based on a user input. In some implementations, the one or more audio packets and a most recently played audio packet stored at the de-jitter buffer 150 correspond to the same talk spurt.

In some implementations, the one or more audio packets are dropped based further on a number of audio packets stored at the de-jitter buffer satisfying a threshold. For example, the de-jitter buffer control circuitry 130 may remove or overwrite stored audio packets from the de-jitter buffer 150 based on a number of audio packets stored at the de-jitter buffer 150 exceeding a particular threshold of the thresholds 146.

In a particular implementation, the method 600 includes stopping audio packets stored at the de-jitter buffer from being dropped in response to a number of consecutive dropped audio packets satisfying a threshold. For example, the de-jitter buffer control circuitry 130 may remove or overwrite stored audio packets from the de-jitter buffer 150 based on a number of consecutive dropped audio packets exceeding another particular threshold of the thresholds 146.

Thus, the method 600 of FIG. 6 enables audio packets to be dropped from the de-jitter buffer based on a delay metric. By dropping one or more audio packets, a mouth-to-ear delay associated with play out of remaining audio packets may be reduced without significant loss of output quality. Dropping audio packets may improve performance of the receiving device during handoff procedures, network faults, or network congestion.

Figure 7:
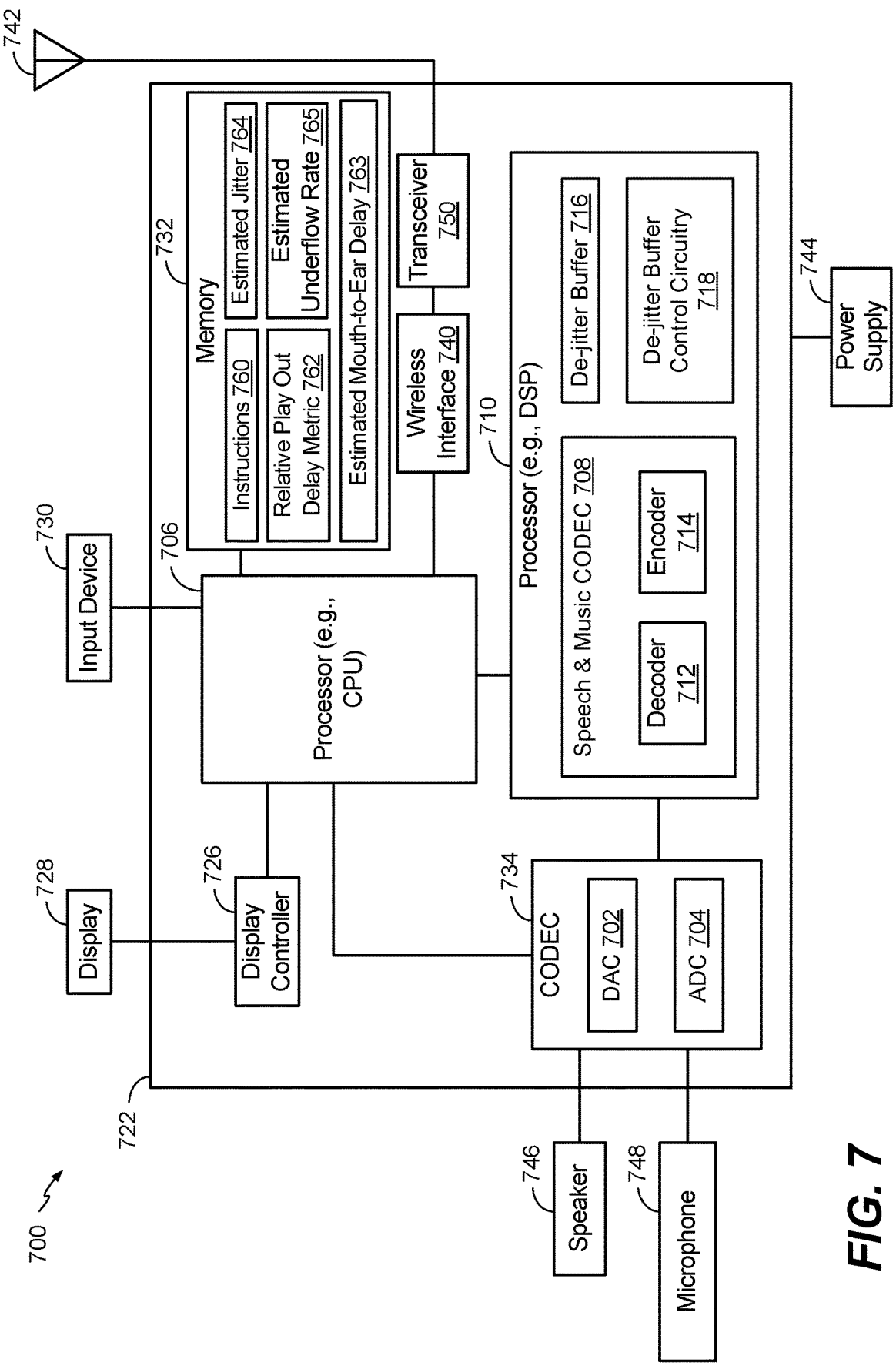
FIG. 7 is a block diagram of a wireless device that adjusts an operating parameter of a de-jitter buffer.

Referring to FIG. 7, a block diagram of a particular illustrative implementation of a device (e.g., a wireless communication device) is depicted and generally designated 700. In various implementations, the device 700 may have more or fewer components than illustrated in FIG. 7. In an illustrative implementation, the device 700 may include or correspond to the first device 102 or the second device 120 of FIG. 1A.

In a particular implementation, the device 700 includes a processor 706, such as a central processing unit (CPU), coupled to a memory 732. The memory 732 includes instructions 760 (e.g., executable instructions) such as computer-readable instructions or processor-readable instructions. The instructions 760 may include one or more instructions that are executable by a computer, such as the processor 706. The device 700 may include one or more additional processors (e.g., one or more digital signal processors (DSPs)). In the particular implementation illustrated in FIG. 7, the device 700 includes a processor 710 (e.g., a DSP). The processor 710 may include a speech and music coder-decoder (CODEC) 708. The speech and music CODEC 708 may include an encoder 714 (e.g., a vocoder encoder, a decoder 712 (e.g., a vocoder decoder), or both. In a particular implementation, the speech and music CODEC 708 may be an enhanced voice services (EVS) CODEC that communicates in accordance with one or more standards or protocols, such as a 3rd Generation Partnership Project (3GPP) EVS protocol.

The processor 710 may also include a de-jitter buffer 716 and de-jitter buffer control circuitry 718. The de-jitter buffer control circuitry 718 may control operations of the de-jitter buffer 716 by setting (or adjusting) operating parameters (e.g., bounds of a target delay range) based on an estimated mouth-to-ear delay 763, estimated jitter 764, an estimated underflow rate 765, or a combination thereof. For example, the de-jitter buffer control circuitry 718 may adjust a bound (e.g., a lower bound, an upper bound, or both) of a target delay range associated with the de-jitter buffer 716 based on the estimated jitter 764, the estimated underflow rate 765, or both. As another example, the de-jitter buffer control circuitry 718 may remove or overwrite stored packets (e.g., one or more audio frames thereof) from the de-jitter buffer 716 based on the estimated mouth-to-ear delay 763 and the estimated jitter 764. The estimated mouth-to-ear delay 763 may include or correspond to a "directly estimated" mouth-to-ear delay or an "indirectly estimated" mouth-to-ear delay. The de-jitter buffer 716 may include or correspond to the de-jitter buffer 150 of FIG. 1A, the de-jitter buffer control circuitry 718 may include or correspond to the de-jitter buffer control circuitry 130 of FIG. 1A, the estimate mouth-to-ear delay 763 may include or correspond to the estimated mouth-to-ear delay 147 of FIG. 1A, the estimated underflow rate 765 may include or correspond to the estimated underflow rate 144 of FIG. 1A, and the estimated jitter 764 may include or correspond to the estimated jitter 142 of FIG. 1A. The estimated mouth-to-ear delay 763, the estimated underflow rate 765, and the estimated jitter 764 may be stored at the memory 732.

FIG. 7 also illustrates that a wireless interface 740, such as a wireless controller, and a transceiver 750 may be coupled to the processor 706 and to an antenna 742, such that wireless data received via the antenna 742, the transceiver 750, and the wireless interface 740 may be provided to the processor 706 and the processor 710. In other implementations, a transmitter and a receiver may be coupled to the processor 706 and to the antenna 742.

The device 700 may include a display controller 726 that is coupled to the processor 706 and to a display 728. A coder/decoder (CODEC) 734 may also be coupled to the processor 706 and the processor 710. A speaker 746 and a microphone 748 may be coupled to the CODEC 734. The CODEC 734 may include a DAC 702 and an ADC 704. In a particular implementation, the CODEC 734 may receive analog signals from the microphone 748, convert the analog signals to digital signals using the ADC 704, and provide the digital signals to the speech and music CODEC 708. The speech and music CODEC 708 may process the digital signals. In a particular implementation, the speech and music CODEC 708 may provide digital signals to the CODEC 734. The CODEC 734 may convert the digital signals to analog signals using the DAC 702 and may provide the analog signals to the speaker 746.

In some implementations, the processor 706, the processor 710, the display controller 726, the memory 732, the CODEC 734, the wireless interface 740, and the transceiver 750 are included in a system-in-package or system-on-chip device 722. In some implementations, an input device 730 and a power supply 744 are coupled to the system-on-chip device 722. Moreover, in a particular implementation, as illustrated in FIG. 7, the display 728, the input device 730, the speaker 746, the microphone 748, the antenna 742, and the power supply 744 are external to the system-on-chip device 722. In a particular implementation, each of the display 728, the input device 730, the speaker 746, the microphone 748, the antenna 742, and the power supply 744 may be coupled to a component of the system-on-chip device 722, such as an interface or a controller.

In a particular implementation, the device 700 includes receive circuitry (e.g., the antenna 742, the transceiver 750, the wireless interface 740, etc.) configured to receive a plurality of audio packets, such as the plurality of audio packets 116 of FIG. 1A. The device 700 also includes the de-jitter buffer control circuitry 718 that is configured to control storing and play out of packets (or one or more audio frames thereof) of the plurality of audio packets 116 at the de-jitter buffer 716 based on operational parameters associated with the de-jitter buffer 716, data stored in the memory 732, or both. For example, the de-jitter buffer control circuitry 718 may remove or overwrite stored audio packets based on the relative play out delay metric 762. As another example, the de-jitter buffer control circuitry 718 may adjust an operating parameter (e.g., the lower bound 132 or the upper bound 134 of FIG. 1A) associated with the de-jitter buffer 716 based on the estimated jitter 764, the estimated underflow rate 765, or both. The device 700 includes the processor 710 configured to output an audio signal based on audio packets played out from the de-jitter buffer 716. The device 700 also includes a speaker 746 configured to output the audio signal generated by the processor 710 (and the CODEC 734).

In an illustrative implementation, the memory 732 includes or stores the instructions 760 (e.g., executable instructions), such as computer-readable instructions or processor-readable instructions. For example, the memory 732 may include or correspond to a non-transitory computer readable medium storing the instructions 760. The instructions 760 may include one or more instructions that are executable by a computer, such as the processor 706 or the processor 710. The instructions 760 may cause the processor 706 or the processor 710 to perform the method 500 of FIG. 5, the method 600 of FIG. 6, or a combination thereof.

In a particular implementation, the instructions 760, when executed by the processor 706 or the processor 710, may cause the processor 706 or the processor 710 to perform operations including receiving, at a first device, a plurality of audio packets via a network from a second device. For example, audio packets may be received via the antenna 742, the transceiver 750, and the wireless interface 740. The operations include storing the plurality of audio packets at a de-jitter buffer of the first device. For example, audio packets of the plurality of audio packets may be stored at the de-jitter buffer 716. The operations include adjusting at least one bound of a target delay range associated with the de-jitter buffer based at least in part on an estimated jitter associated with the plurality of audio packets, an estimated underflow rate associated with the plurality of audio packets, or both. For example, the de-jitter buffer control circuitry 718 may adjust the at least one bound based on the estimated jitter 764, the estimated underflow rate 765, or both. The operations include generating, at the first device, an audio signal based on the plurality of audio packets stored at the de-jitter buffer. For example, the processor 710 (and/or the CODEC 734) may generate an audio signal based on audio packets played out from the de-jitter buffer 716. The operations may also include outputting the audio signal at the first device. For example, the speaker 746 may output the audio signal.

In some implementations, the at least one bound includes a lower bound associated with the target delay range, and adjusting the at least one bound includes adjusting a lower bound based on the estimated jitter associated with the plurality of audio packets, the estimated underflow rate, or both. In another particular implementation, the at least one bound includes an upper bound associated with the target delay range, and adjusting the at least one bound includes adjusting the upper bound based on the estimated underflow rate and an estimated mouth-to-ear delay associated with initiating an audio output based on at least one audio packet stored at the de-jitter buffer. In some implementations, the at least one bound includes both the lower bound and the upper bound, and adjusting the at least one bound includes adjusting the lower bound and adjusting the upper bound.

In another particular implementation, the instructions 760, when executed by the processor 706 or the processor 710, may cause the processor 706 or the processor 710 to store a plurality of audio packets received from a second device at a de-jitter buffer of a first device. The instructions 760 may also cause the processor 706 or the processor 710 to drop one or more audio packets from the de-jitter buffer based on a relative play out delay metric satisfying a threshold, where the relative play out delay metric is based on a result of a comparison of a difference between audio play out time values and a difference between audio generation time values at the source (converted to time units based on a timestamp clock frequency if the generation time values are indicated by timestamps). For example, the de-jitter buffer control circuitry 718 may remove one or more audio packets of the audio packets from the de-jitter buffer 716 based on the relative play out delay metric 762.

In some implementations, the one or more audio packets and a most recently played audio packet stored at the de-jitter buffer correspond to the same talk spurt. The one or more audio packet may be dropped conditioned on a number of audio packets stored at the de-jitter buffer satisfying a threshold. Additionally, dropping audio packets from the de-jitter buffer may stopped in response to a number of consecutive dropped audio packets satisfying a second threshold.

One or more of the disclosed aspects may be implemented in a system or an apparatus, such as the device 700, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 700 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Figure 8:
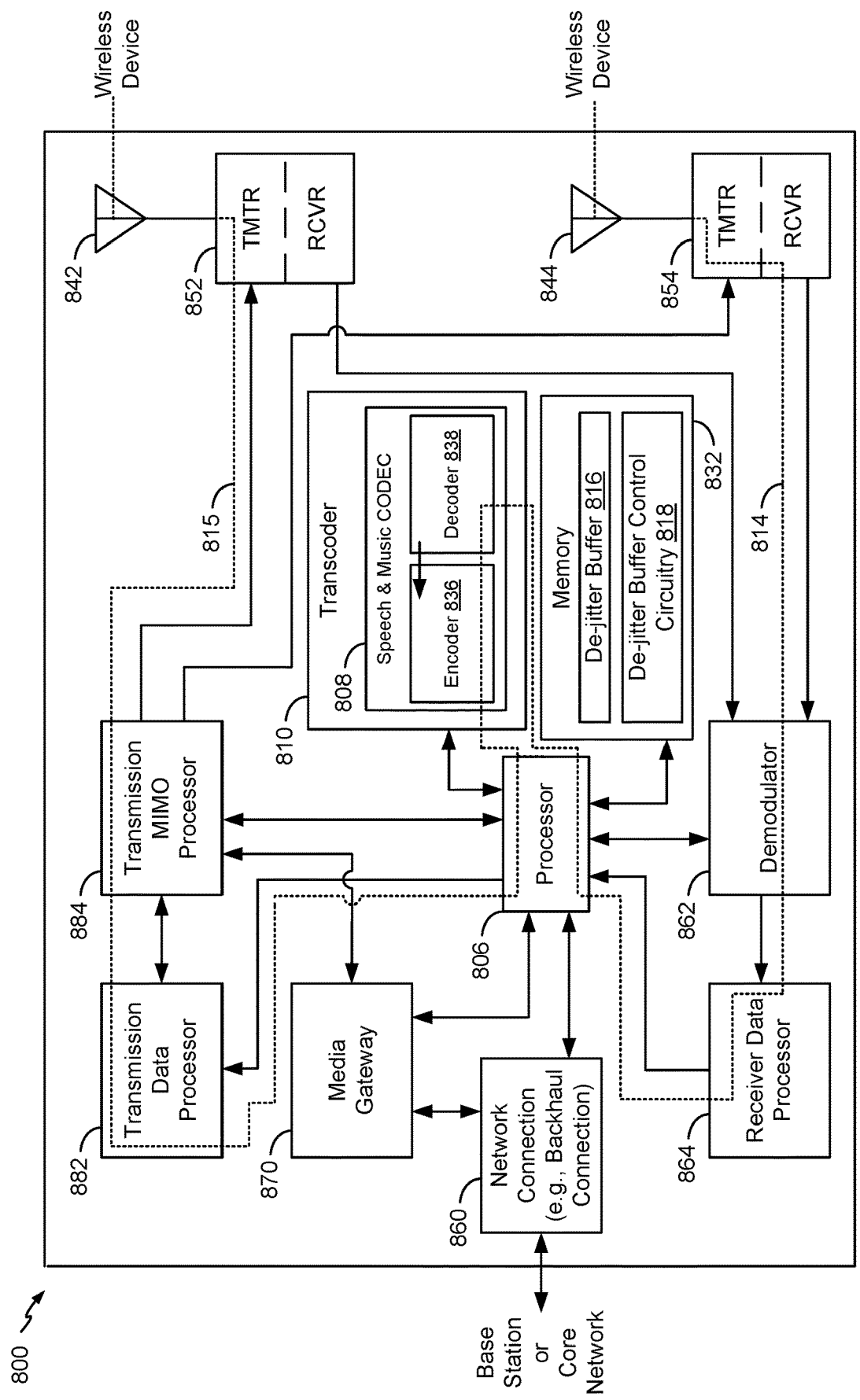
FIG. 8 is a block diagram of a network device that adjusts an operating parameter of a de-jitter buffer.

Referring to FIG. 8, a block diagram of a particular illustrative example of a network device 800 is depicted. In various implementations, the network device 800 may have more components or fewer components than illustrated in FIG. 8. In an illustrative example, the network device 800 may include the first device 102 of FIG. 1A or the second device 120 of FIG. 1A. In an illustrative example, the network device 800 may operate according to one or more of the methods of FIGS. 5-6. In a particular implementation, the network device 800 is a media gateway device. In an alternate implementation, the network device 800 is a base station.

The network device 800 may be part of a wireless communication system. The wireless communication system may include multiple network devices and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 700 of FIG. 7.

Various functions may be performed by one or more components of network device 800 (and/or in other components not shown), such as sending and receiving messages and data (e.g., audio data). In a particular example, the network device 800 includes a processor 806 (e.g., a CPU). The network device 800 may include a transcoder 810. The transcoder 810 may include a speech and music CODEC 808. For example, the transcoder 810 may include one or more components (e.g., circuitry) configured to perform operations of the speech and music CODEC 808. As another example, the transcoder 810 may be configured to execute one or more computer-readable instructions to perform the operations of the speech and music CODEC 808. The speech and music CODEC 808 may include an encoder 836 and a decoder 838. Although the speech and music CODEC 808 is illustrated as a component of the transcoder 810, in other examples one or more components of the speech and music CODEC 808 may be included in the processor 806, another processing component, or a combination thereof. For example, the decoder 838 (e.g., a vocoder decoder) may be included in a receiver data processor 864. As another example, the encoder 836 (e.g., a vocoder encoder) may be included in a transmission data processor 882.

The transcoder 810 may function to transcode messages and data between two or more networks. The transcoder 810 may be configured to convert message and audio data from a first format (e.g., a digital format) to a second format. To illustrate, the decoder 838 may decode encoded signals having a first format and the encoder 836 may encode the decoded signals into encoded signals having a second format. Additionally or alternatively, the transcoder 810 may be configured to perform data rate adaptation. For example, the transcoder 810 may downconvert a data rate or upconvert the data rate without changing a format the audio data. To illustrate, the transcoder 810 may downconvert 64 kbit/s signals into 16 kbit/s signals.

The network device 800 may include a memory 832 that includes a de-jitter buffer 816 and de-jitter buffer control circuitry 818. In a particular implementation, the de-jitter buffer 816 corresponds to the de-jitter buffer 150 of FIG. 1A and the de-jitter buffer control circuitry 818 corresponds to the de-jitter buffer control circuitry 130 of FIG. 1A. The memory 832, such as a computer-readable storage device, may include instructions. The instructions may include one or more instructions that are executable by the processor 806, the transcoder 810, or a combination thereof, to perform one or more of the methods of FIGS. 5-6. The network device 800 may include multiple transmitters and receivers (e.g., transceivers), such as a first transceiver 852 and a second transceiver 854, coupled to an array of antennas. The array of antennas may include a first antenna 842 and a second antenna 844. The array of antennas may be configured to wirelessly communicate with one or more wireless devices, such as the device 700 of FIG. 7. For example, the second antenna 844 may receive a data stream 814 (e.g., a bit stream) from a wireless device. The data stream 814 may include messages, data (e.g., encoded speech data), or a combination thereof.

The network device 800 may include a network connection 860, such as backhaul connection. The network connection 860 may be configured to communicate with a core network or one or more base stations of the wireless communication network. For example, the network device 800 may receive a second data stream (e.g., messages or audio data) from a core network via the network connection 860. The network device 800 may process the second data stream to generate messages or audio data and provide the messages or the audio data to one or more wireless device via one or more antennas of the array of antennas or to another base station via the network connection 860. In a particular implementation, the network connection 860 may be a wide area network (WAN) connection, as an illustrative, non-limiting example. In some implementations, the core network may include or correspond to a Public Switched Telephone Network (PSTN), a packet backbone network, or both.

The network device 800 may include a media gateway 870 that is coupled to the network connection 860 and the processor 806. The media gateway 870 may be configured to convert between media streams of different telecommunications technologies. For example, the media gateway 870 may convert between different transmission protocols, different coding schemes, or both. To illustrate, the media gateway 870 may convert from PCM signals to Real-Time Transport Protocol (RTP) signals, as an illustrative, non-limiting example. The media gateway 870 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 870 may include a transcoder, such as the transcoder 810, and may be configured to transcode data when codecs are incompatible. For example, the media gateway 870 may transcode between an Adaptive Multi-Rate (AMR) codec and a G.711 codec, as an illustrative, non-limiting example. The media gateway 870 may include a router and a plurality of physical interfaces. In some implementations, the media gateway 870 may also include a controller (not shown). In a particular implementation, the media gateway controller may be external to the media gateway 870, external to the network device 800, or both. The media gateway controller may control and coordinate operations of multiple media gateways. The media gateway 870 may receive control signals from the media gateway controller and may function to bridge between different transmission technologies and may add service to end-user capabilities and connections.

The network device 800 may include a demodulator 862 that is coupled to the transceivers 852, 854, the receiver data processor 864, and the processor 806, and the receiver data processor 864 may be coupled to the processor 806. The demodulator 862 may be configured to demodulate modulated signals received from the transceivers 852, 854 and to provide demodulated data to the receiver data processor 864. The receiver data processor 864 may be configured to extract a message or audio data from the demodulated data and send the message or the audio data to the processor 806.

The network device 800 may include a transmission data processor 882 and a transmission multiple input-multiple output (MIMO) processor 884. The transmission data processor 882 may be coupled to the processor 806 and the transmission MIMO processor 884. The transmission MIMO processor 884 may be coupled to the transceivers 852, 854 and the processor 806. In some implementations, the transmission MIMO processor 884 may be coupled to the media gateway 870. The transmission data processor 882 may be configured to receive the messages or the audio data from the processor 806 and to code the messages or the audio data based on a coding scheme, such as CDMA or orthogonal frequency-division multiplexing (OFDM), as illustrative, non-limiting examples. The transmission data processor 882 may provide the coded data to the transmission MIMO processor 884.

The coded data may be multiplexed with other data, such as pilot data, using CDMA or OFDM techniques to generate multiplexed data. The multiplexed data may then be modulated (i.e., symbol mapped) by the transmission data processor 882 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 806.

The transmission MIMO processor 884 may be configured to receive the modulation symbols from the transmission data processor 882 and may further process the modulation symbols and may perform beamforming on the data. For example, the transmission MIMO processor 884 may apply beamforming weights to the modulation symbols. The beamforming weights may correspond to one or more antennas of the array of antennas from which the modulation symbols are transmitted.

During operation, the second antenna 844 of the network device 800 may receive a data stream 814. The second transceiver 854 may receive the data stream 814 from the second antenna 844 and may provide the data stream 814 to the demodulator 862. The demodulator 862 may demodulate modulated signals of the data stream 814 and provide demodulated data to the receiver data processor 864. The receiver data processor 864 may extract audio data from the demodulated data and provide the extracted audio data to the processor 806.

The data stream 814 or the extracted audio data may include or correspond to a plurality of audio packets (e.g., the plurality of audio packets 116) that are received from another device. The de-jitter buffer control circuitry 818 may store audio packets of the plurality of audio packets at the de-jitter buffer 816. The de-jitter buffer control circuitry 818 may adjust at least one bound associated with a target delay range (or other operational parameters) based on an estimated underflow rate associated with audio packets received and stored at the de-jitter buffer 816 (and based on an estimated jitter associated with the audio packets). Although illustrated as external to the media gateway 870, in an alternate implementation, the de-jitter buffer 816 and the de-jitter buffer control circuitry 818 may be included in the media gateway 870.

The processor 806 may provide the audio data (e.g., audio packets or audio frames stored in the de-jitter buffer 816) to the transcoder 810 for transcoding. The decoder 838 of the transcoder 810 may decode the audio data from a first format into decoded audio data and the encoder 836 may encode the decoded audio data into a second format. In some implementations, the encoder 836 may encode the audio data using a higher data rate (e.g., upconvert) or a lower data rate (e.g., downconvert) than received from the wireless device. In other implementations, the audio data may not be transcoded. Although transcoding (e.g., decoding and encoding) is illustrated as being performed by a transcoder 810, the transcoding operations (e.g., decoding and encoding) may be performed by multiple components of the network device 800. For example, decoding may be performed by the receiver data processor 864 and encoding may be performed by the transmission data processor 882. In other implementations, the processor 806 may provide the audio data to the media gateway 870 for conversion to another transmission protocol, coding scheme, or both. The media gateway 870 may provide the converted data to a base station or core network via the network connection 860.

Encoded audio data generated at the encoder 836, such as transcoded data, may be provided to the transmission data processor 882 or the network connection 860 via the processor 806. The transcoded audio data from the transcoder 810 may be provided to the transmission data processor 882 for coding according to a modulation scheme, such as OFDM, to generate the modulation symbols. The transmission data processor 882 may provide the modulation symbols to the transmission MIMO processor 884 for further processing and beamforming. The transmission MIMO processor 884 may apply beamforming weights and may provide the modulation symbols to one or more antennas of the array of antennas, such as the first antenna 842 via the first transceiver 852. Thus, the network device 800 may provide a transcoded data stream 815, that corresponds to the data stream 814 received from the wireless device, to another wireless device. The transcoded data stream 815 may have a different encoding format, data rate, or both, than the data stream 814. In other implementations, the transcoded data stream 815 may be provided to the network connection 860 for transmission to a base station or a core network.

The network device 800 may therefore include a computer-readable storage device (e.g., the memory 832) storing instructions that, when executed by a processor (e.g., the processor 806 or the transcoder 810), cause the processor to perform operations including receiving, at a first device, a plurality of audio packets via a network from a second device. The operations may include storing the plurality of audio packets at a de-jitter buffer of the first device. For example, audio packets of the plurality of audio packets may be stored at the de-jitter buffer 816. The operations may include adjusting at least one bound of a target delay range associated with the de-jitter buffer based at least in part on an estimated jitter associated with the plurality of audio packets, an estimated underflow rate associated with the plurality of audio packets, or both. For example, the de-jitter buffer control circuitry 818 may adjust a lower bound, an upper bound, or both, based on the estimated underflow rate (and based further on an estimated jitter). The operations may further include generating, at the first device, an audio signal based on the plurality of audio packets stored at the de-jitter buffer and outputting the audio signal at the first device.

In some implementations, adjusting the at least one bound includes adjusting a lower bound associated with the target delay range based on the estimated jitter and the estimated underflow rate or adjusting an upper bound associated with the target delay range based on the estimated underflow rate and an estimated mouth-to-ear delay associated with initiating an audio output based on at least one audio packet stored at the de-jitter buffer.

In another particular implementation, the instructions, when executed by the processor, may cause the processor (e.g., the processor 806 or the transcoder 810) to store a plurality of audio packets received from a second device at a de-jitter buffer of a first device. The instructions may also cause the processor to drop one or more audio packets from the de-jitter buffer based on a relative play out delay metric satisfying a threshold, where the relative play out delay metric is based a comparison of a difference between audio play out time values and a difference between audio generation time values at the second device (converted to time units based on a timestamp clock frequency if the generation time values are indicated by timestamps). For example, the de-jitter buffer control circuitry 818 may remove one or more audio packets of the audio packets from the de-jitter buffer 816 based on the relative play out delay metric.

In some implementations, the one or more audio packets and a most recently played audio packet stored at the de-jitter buffer correspond to the same talk spurt. The one or more audio packets may be dropped conditioned on a number of audio packets stored at the de-jitter buffer satisfying a threshold. Additionally, dropping audio packets from the de-jitter buffer may stopped in response to a number of consecutive dropped audio packets satisfying a second threshold.

In conjunction with the described aspects, an apparatus includes means for receiving a plurality of audio packets with varying delays from a device. The means for receiving include the receiver 122 of FIG. 1A, the second device 120 of FIG. 1A, the antenna 742, the transceiver 750, and the wireless interface 740 of FIG. 7, the second antenna 844, the second transceiver 854 of FIG. 8, one or more other structures or circuits configured to receive a plurality of audio packets from another device, or any combination thereof.

The apparatus includes means for storing the plurality of audio packets. The means for storing may include or correspond to the de-jitter buffer control circuitry 130 of FIG. 1A, the de-jitter buffer 150 of FIG. 1A, the de-jitter buffer 716 of FIG. 7, the de-jitter buffer 816 of FIG. 8, one or more other structures or circuits configured to store the plurality of audio packets, or any combination thereof.

The apparatus includes means for adjusting at least one bound of a target delay range associated with the means for storing based at least in part on an estimated jitter associated with the plurality of audio packets, an estimated underflow rate associated with the plurality of audio packets, or both. The means for adjusting may include or correspond to the de-jitter buffer control circuitry 130 of FIG. 1A, the de-jitter buffer control circuitry 718, the processor 706, the processor 710, and the memory 732 storing the instructions 760 of FIG. 7, the de-jitter buffer control circuitry 818, the processor 806, the memory 832 of FIG. 8, one or more other structures or circuits configured to adjust the at least one bound of the target delay range associated with the means for storing based at least in part on the estimated underflow rate associated with the plurality of audio packets, or any combination thereof.

The apparatus includes means for generating an audio signal based on the plurality of audio packets. The means for generating may include or correspond to the processor 126 of FIG. 1A, the processor 706, the processor 710 of FIG. 7, the processor 806 of FIG. 8, one or more other structures or circuits configured to generate an audio signal based on a plurality of audio packets, or any combination thereof.

The apparatus further includes means for outputting the audio signal. The means for outputting may include or correspond to the speaker 128, the processor 126 of FIG. 1A, the speaker 746, the processor 706, the processor 710 of FIG. 7, the processor 806 of FIG. 8, one or more other structures or circuits configured to output an audio signal, or any combination thereof.

In a particular implementation, the at least one bound includes a lower bound associated with the target delay range, an upper bound associated with the target delay range, or both. In another particular implementation, the apparatus includes means for determining the estimated underflow rate, the estimated jitter associated with the plurality of audio packets, or both. The means for determining may include or correspond to the de-jitter buffer control circuitry 130, the processor 126 of FIG. 1A, the de-jitter buffer control circuitry 718, the processor 706, the processor 710 of FIG. 7, the de-jitter buffer control circuitry 818, the processor 806 of FIG. 8, one or more other structures or circuits configured to determine the estimated underflow rate, the estimated jitter, or both, or any combination thereof. In another particular implementation, the means receiving, the means for storing, the means for adjusting, the means for generating, and the means for outputting are integrated in a mobile device.

In another implementation, a second apparatus includes means for storing a plurality of audio packets that are received with varying delays from a first device. The means for storing may include or correspond to the de-jitter buffer control circuitry 130 of FIG. 1A, the de-jitter buffer 150 of FIG. 1A, the de-jitter buffer 716 of FIG. 7, the de-jitter buffer 816 of FIG. 8, one or more other structures or circuits configured to store the plurality of audio packets that are received with varying delays from the first device, or any combination thereof.

The second apparatus further includes means for dropping one or more audio packets from the means for storing based on a relative play out delay metric satisfying a threshold. The relative play out delay metric may be based on a result of a comparison of a difference between audio play out time values and a difference between audio generation time values at the first device (converted to time units based on a timestamp clock frequency if the generation time values are indicated by timestamps). The means for dropping may include or correspond to the de-jitter buffer control circuitry 130 of FIG. 1A, the de-jitter buffer control circuitry 718, the processor 706, the processor 710, and the memory 732 storing the instructions 760 of FIG. 7, the de-jitter buffer control circuitry 818, the processor 806, the memory 832 of FIG. 8, one or more other structures or circuits configured to drop the one or more audio packets from the means for storing based on the relative play out delay metric satisfying the threshold, or any combination thereof.

Although one or more of FIGS. 1A-C, 2A-C, and 3-8 may illustrate systems, apparatuses, and/or methods according to the teachings of the disclosure, the disclosure is not limited to these illustrated systems, apparatuses, and/or methods. One or more functions or components of any of FIGS. 1A-C, 2A-C, and 3-8 as illustrated or described herein may be combined with one or more other portions of another of FIGS. 1A-C, 2A-C, and 3-8. For example, one or more elements of the method 500 of FIG. 5, one or more of the elements of the method 600 of FIG. 6, or a combination thereof, may be performed in combination with other operations described herein. Accordingly, no single implementation described herein should be construed as limiting and implementations of the disclosure may be suitably combined without departing form the teachings of the disclosure. As an example, one or more operations described with reference to FIG. 5 or FIG. 6 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
a de-jitter buffer configured to store a plurality of audio packets received from a source device;
de-jitter buffer control circuitry configured to:
adjust an upper bound of a target delay range associated with the de-jitter buffer based at least in part on an estimated underflow rate associated with the plurality of audio packets and a mouth-to-ear delay associated with at least one audio packet of the plurality of audio packets stored at the de-jitter buffer; and
output at least one of the plurality of audio packets, after adjustment of the upper bound, based on a delay value selected from within the target delay range;
a processor configured to generate an audio signal based on the plurality of audio packets stored at the de-jitter buffer;
a receiver configured to receive the plurality of audio packets via a network from the source device; and
a speaker configured to output the audio signal.

2. The apparatus of claim 1, wherein the de-jitter buffer control circuitry is further configured to adjust a lower bound associated with the target delay range, and wherein the lower bound corresponds to a minimum target delay associated with play out of a first audio packet of a group of audio packets from the de-jitter buffer.

3. The apparatus of claim 2, wherein the de-jitter buffer control circuitry is configured to decrease the lower bound in response to the estimated underflow rate failing to satisfy a first underflow threshold.

4. The apparatus of claim 2, wherein the de-jitter buffer control circuitry is configured to decrease the lower bound in response to an estimated jitter associated with the plurality of audio packets failing to satisfy a first jitter threshold.

5. The apparatus of claim 4, wherein the estimated jitter is based on a particular number of previously received audio packets.

6. The apparatus of claim 5, wherein the particular number of previously received audio packets and the first jitter threshold are adjustable.

7. The apparatus of claim 1, wherein the upper bound corresponds to a maximum target delay associated with play out of a first audio packet of a group of audio packets from the de-jitter buffer.

8. The apparatus of claim 7, wherein the de-jitter buffer control circuitry is configured to increase the upper bound in response to the estimated underflow rate satisfying a third underflow threshold, and wherein the mouth-to-ear delay associated with at least one audio packet in the de-jitter buffer fails to satisfy a first delay threshold associated with a maximum allowable mouth-to-ear delay after the upper bound is increased.

9. The apparatus of claim 8, wherein the de-jitter buffer control circuitry is configured to increase a lower bound associated with the target delay range in response to an estimated jitter associated with the plurality of audio packets satisfying a second jitter threshold, the estimated underflow rate satisfying a second underflow threshold, or both.

10. The apparatus of claim 1, wherein the mouth-to-ear delay comprises a directly estimated mouth-to-ear delay.

11. The apparatus of claim 1, wherein the mouth-to-ear delay comprises an indirectly estimated mouth-to-ear delay.

12. The apparatus of claim 8, wherein the de-jitter buffer control circuitry is further configured to decrease the upper bound based on the mouth-to-ear delay satisfying the first delay threshold, the estimated underflow rate failing to satisfy a fourth underflow threshold, or both.

13. The apparatus of claim 1, further comprising an antenna.

14. The apparatus of claim 13, wherein the de-jitter buffer, the de-jitter buffer control circuitry, the antenna, the processor, the receiver, and the speaker are integrated into a mobile device.

15. The apparatus of claim 13, wherein the de-jitter buffer, the de-jitter buffer control circuitry, the antenna, the processor, the receiver, and the speaker are integrated into a base station.

16. The apparatus of claim 1, wherein the de-jitter buffer control circuitry is configured to increase the upper bound in response to the estimated underflow rate satisfying an underflow threshold.

17. The apparatus of claim 16, wherein the mouth-to-ear delay associated with at least one audio packet in the de-jitter buffer fails to exceed a delay threshold associated with a particular mouth-to-ear delay after the upper bound is increased.

18. A method of outputting audio signals, the method comprising:
receiving, at a first device, a plurality of audio packets via a network from a second device;
storing the plurality of audio packets at a de-itter buffer of the first device;
adjusting an upper bound of a target delay range associated with the de-jitter buffer based at least in part on an estimated underflow rate associated with the plurality of audio packets and a mouth-to-ear delay associated with at least one audio packet of the plurality of audio packets stored at the de-jitter buffer;
outputting, from the de-jitter buffer, at least one of the plurality of audio packets, after adjustment of the upper bound, based on a delay value selected from within the target delay range, wherein adjustment of the upper bound increases or decreases a range of values available for the target delay;
generating, at the first device, an audio signal based on the plurality of audio packets stored at the de-jitter buffer; and
outputting the audio signal at the first device.

19. The method of claim 18, wherein the plurality of audio packets is received in a first order, and wherein a second plurality of audio packets that correspond to the plurality of audio packets is transmitted in a second order.

20. The method of claim 18, wherein the target delay range is between a lower bound and the upper bound.

21. The method of claim 18, further comprising decreasing a lower bound associated with the target delay range in response to an estimated jitter associated with the plurality of audio packets failing to satisfy a first jitter threshold, the estimated underflow rate failing to satisfy a first underflow threshold, or both.

22. The method of claim 18, further comprising increasing a lower bound associated with the target delay range in response to an estimated jitter associated with the plurality of audio packets satisfying a second jitter threshold, the estimated underflow rate satisfying a second underflow threshold, or both.

23. The method of claim 22, further comprising:
increasing the upper bound in response to the estimated underflow rate satisfying a third underflow threshold; and
capping the upper bound at a current value in response to a determination that the mouth-to-ear delay associated with at least one audio packet stored at the de-jitter buffer matches a maximum allowable mouth-to-ear delay.

24. The method of claim 18, further comprising:
determining an instantaneous underflow rate associated with the plurality of audio packets; and
determining the estimated underflow rate based on the instantaneous underflow rate.

25. The method of claim 18, wherein the first device comprises a mobile device or a base station.

26. An apparatus comprising:
means for receiving a plurality of audio packets with varying delays from a device;
means for storing the plurality of audio packets;
means for adjusting an upper bound of a target delay range associated with the means for storing based at least in part on an estimated underflow rate associated with the plurality of audio packets and a mouth-to-ear delay associated with at least one audio packet stored at the means for storing, wherein the means for storing the plurality of audio packets is configured to output at least one of the plurality of audio packets, after adjustment of the upper bound, based on a delay value selected from within the target delay range, and wherein adjustment of the upper bound increases or decreases a range of values available for the target delay;
means for generating an audio signal based on the plurality of audio packets; and
means for outputting the audio signal.

27. The apparatus of claim 26, wherein the means for receiving, the means for storing, the means for adjusting, the means for generating, and the means for outputting are integrated in a mobile device.

28. A non-transitory, computer readable medium that includes instructions that, when executed by a processor, cause the processor to perform operations comprising:
receiving, at a first device, a plurality of audio packets via a network from a second device;
storing the plurality of audio packets at a de-jitter buffer of the first device;
adjusting an upper bound of a target delay range associated with the de-jitter buffer based at least in part on an estimated underflow rate associated with the plurality of audio packets and a mouth-to-ear delay associated with at least one audio packet stored at the de-jitter buffer;
outputting, from the de-jitter buffer, at least one of the plurality of audio packets, after adjustment of the upper bound, based on a delay value selected from within the target delay range, wherein adjustment of the upper bound increases or decreases a range of values available for the target delay;
generating, at the first device, an audio signal based on the plurality of audio packets stored at the de-jitter buffer; and
outputting the audio signal at the first device.

29. The non-transitory, computer readable medium of claim 28, wherein the operations further comprise adjusting a lower bound associated with the target delay range based on an estimated jitter associated with the plurality of audio packets and the estimated underflow rate.

30. The non-transitory, computer readable medium of claim 28, wherein adjusting the upper bound comprises increasing the upper bound based on the estimated underflow rate and the mouth-to-ear delay.

* * * * *